United States Patent [19]
Ogata

[11] Patent Number: 5,875,209
[45] Date of Patent: Feb. 23, 1999

[54] DIGITAL RADIO SYSTEM INCLUDING REPEATER EQUIPMENT, END EQUIPMENT AND RECEIVER

[75] Inventor: Isao Ogata, Kawasaki, Japan

[73] Assignee: Fujitsu Limited, Kawasaki, Japan

[21] Appl. No.: 629,389

[22] Filed: Apr. 8, 1996

[30] Foreign Application Priority Data

Apr. 6, 1995 [JP] Japan ................................ 7-081040

[51] Int. Cl.⁶ ........................................................ H04B 3/36
[52] U.S. Cl. .......................... 375/211; 375/348; 375/347
[58] Field of Search .................................. 375/211, 214, 375/347, 348; 455/7, 16, 21, 23, 133

[56] References Cited

U.S. PATENT DOCUMENTS

| | | | |
|---|---|---|---|
| 4,766,606 | 8/1988 | Bardutz et al. ........................ | 375/214 |
| 5,291,519 | 3/1994 | Tsurumaru .............................. | 375/347 |
| 5,303,261 | 4/1994 | Junod et al. ............................ | 375/214 |

FOREIGN PATENT DOCUMENTS 61-005658  1/1986  Japan .

OTHER PUBLICATIONS

International Telecommunication Union (ITU) Telecommunication Standardization Sector Study Group 13 — Contribution 4, COM 13–4–E, "Recommendation G.826: Error Performance Parameters and Objectives for International, Constant Bit Rate Digital Paths At or Above the Primary Rate," Mar. 1993, pp. 1–19.

Meyer, J., "Implications of Draft New ITU–T Recommendation G.826 on Digital Radio–Relay Systems," *Radio Relay Systems*, Oct. 11–14, 1993, Conference Publication No. 386, pp. 21–28.

*Primary Examiner*—Don N. Vo
*Attorney, Agent, or Firm*—Staas & Halsey

[57] ABSTRACT

A digital radio system able to efficiently maintain transmission quality, provided with repeater equipment including a plurality of pairs of regenerating units for individually receiving waves of upstream and downstream routes at repeating points of redundantly configured radio transmission lines formed under a full duplex mode and demultiplexing and extracting the transmission information and control information multiplexed in the received wave. The digital radio system further includes a plurality of pairs of repeating units for multiplexing the transmission information and controlling information individually extracted by the plurality of pairs of regenerating units and relaying the multiplexed information to the following repeater sections through the redundantly configured radio transmission lines. A plurality of intersymbol interference measuring units are provided for individually measuring the degree or frequency of intersymbol interference of received waves for one of the upstream and downstream routes, the repeating units corresponding to the one upstream or downstream route among the plurality of pairs of repeating units further including units for multiplexing the transmission information and control information individually extracted by the regenerating units corresponding to that one route among the plurality of pairs of regenerating units with information indicative of the degree or frequency of intersymbol interference.

39 Claims, 26 Drawing Sheets

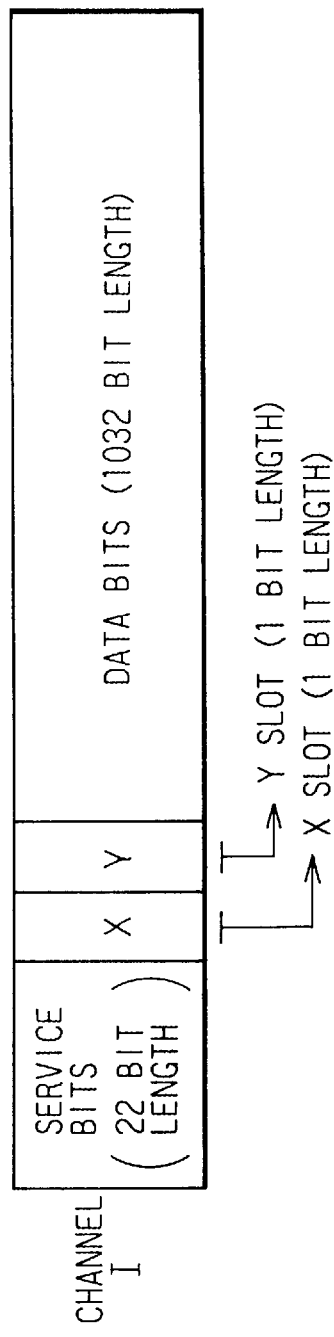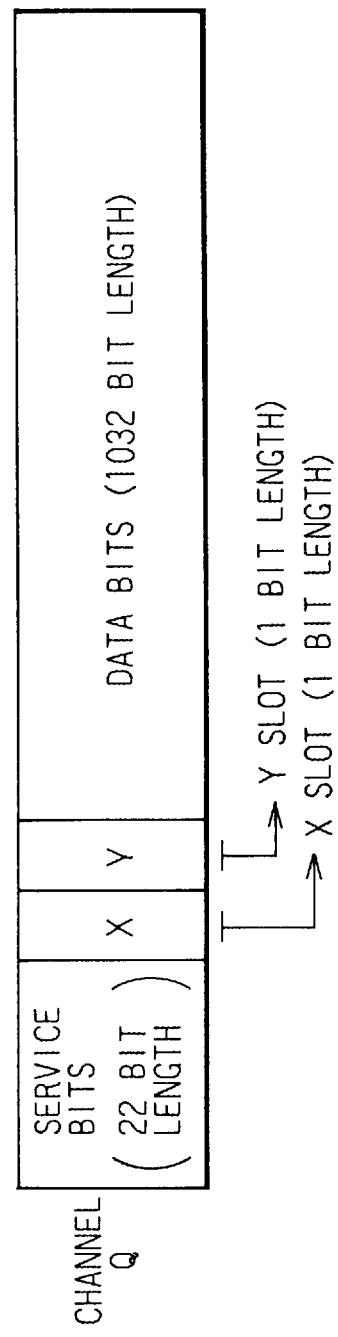

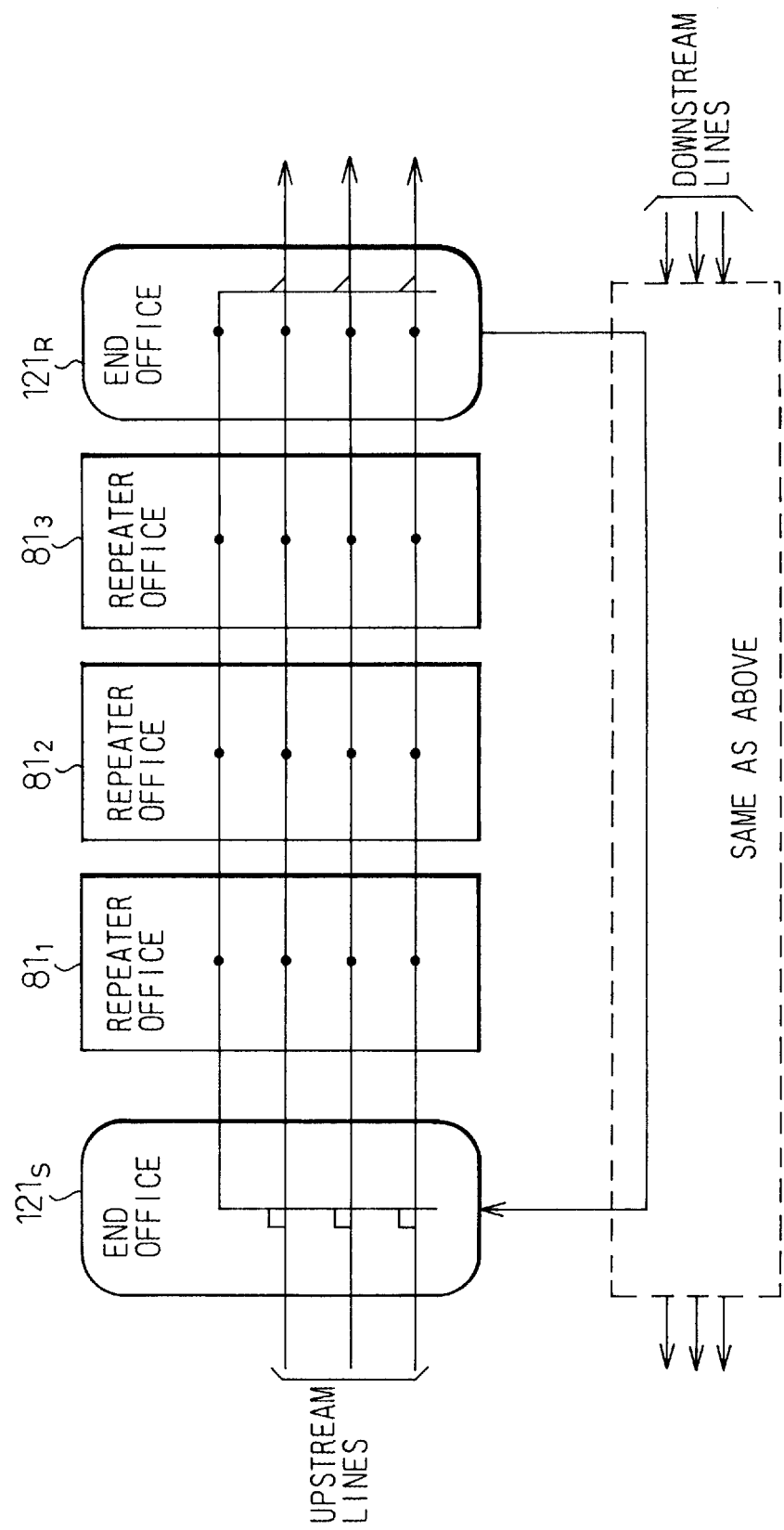

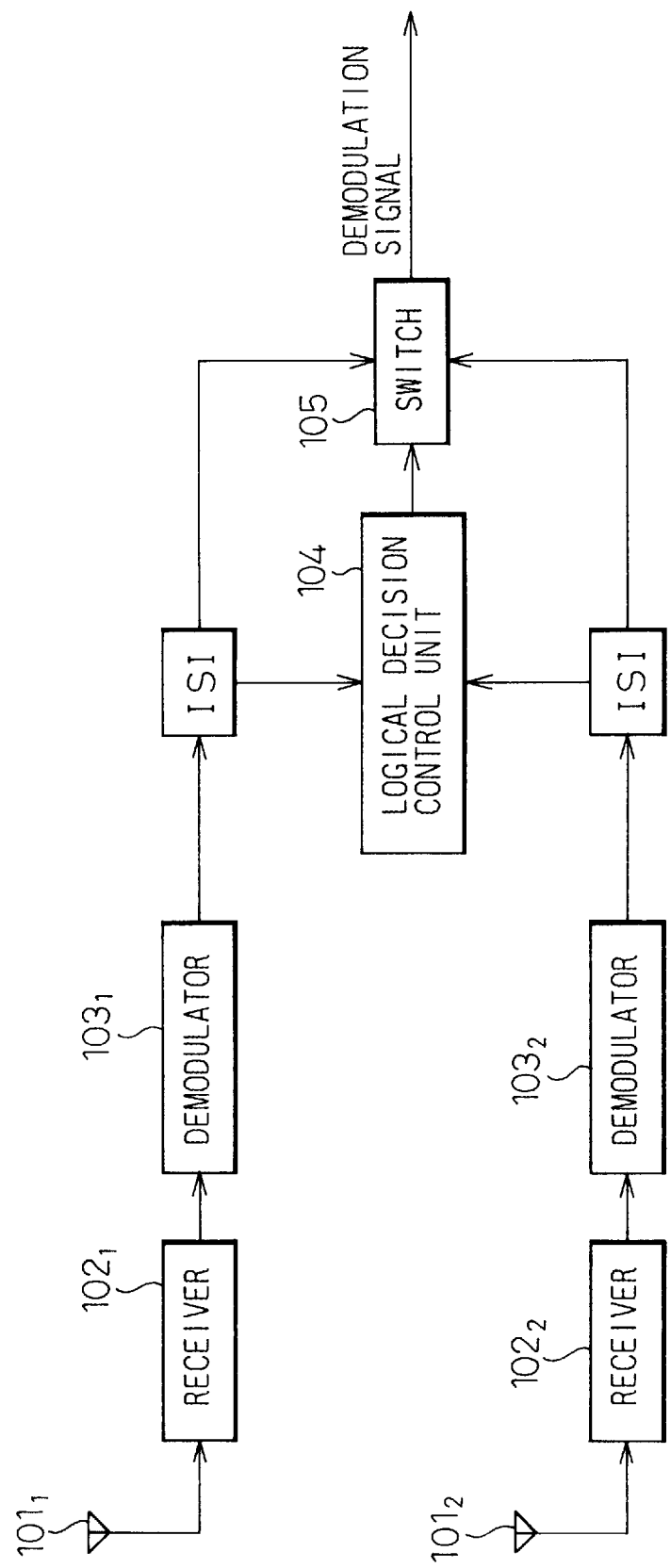

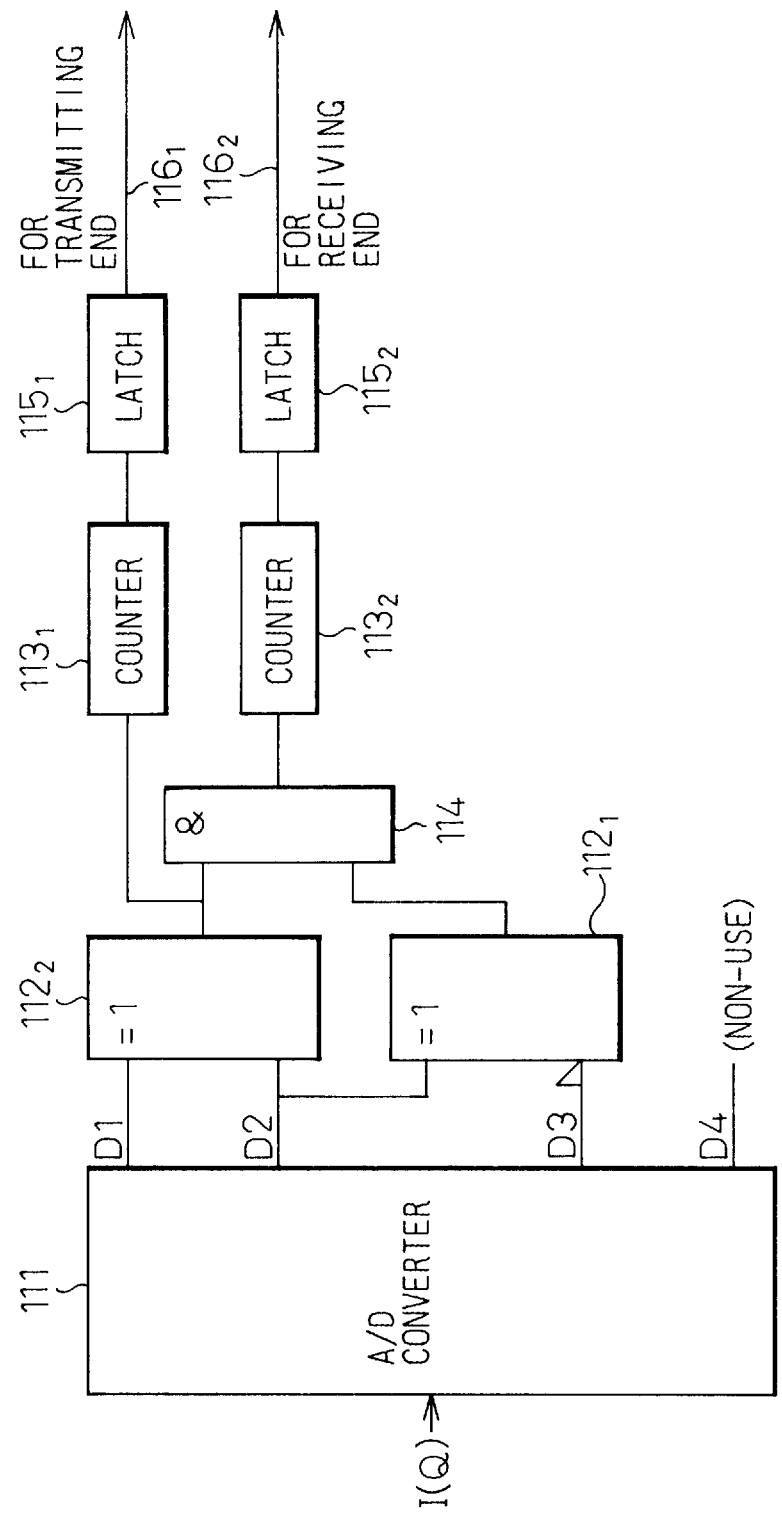

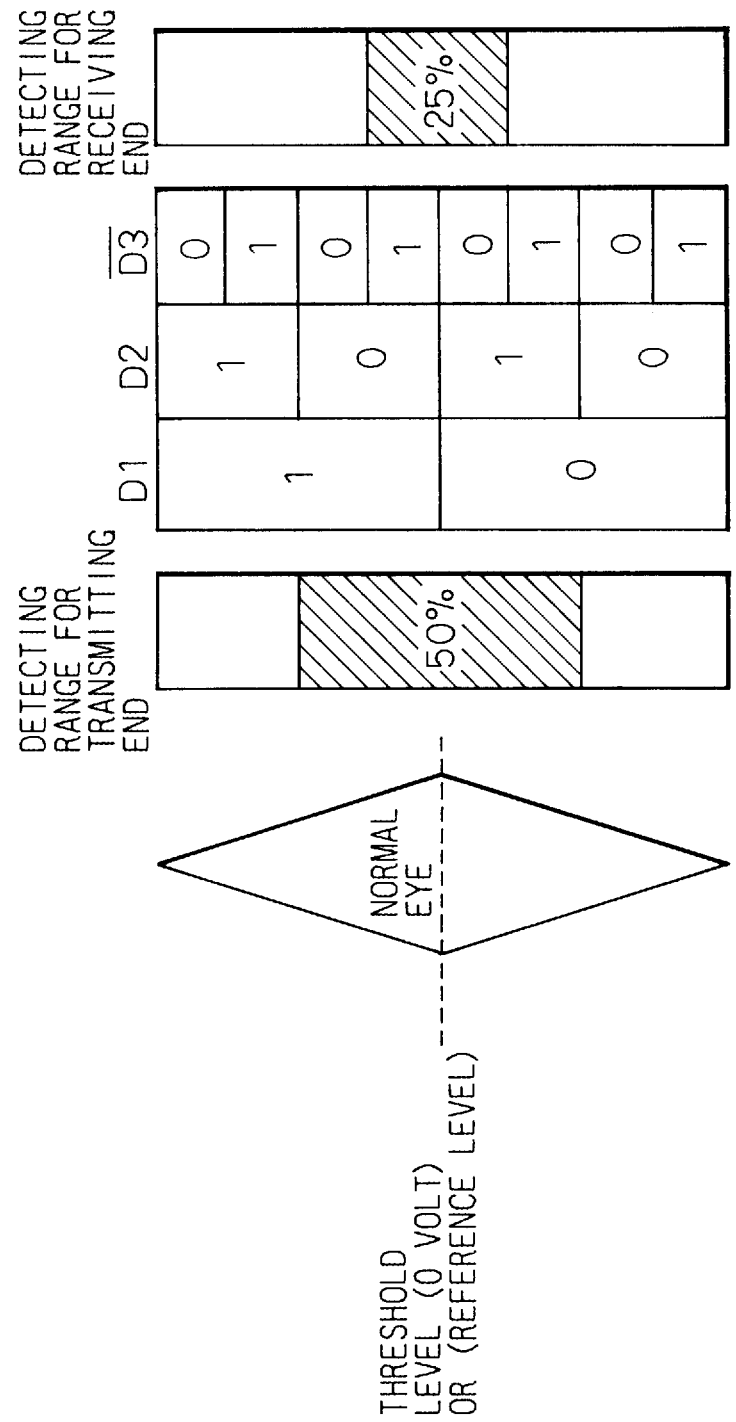

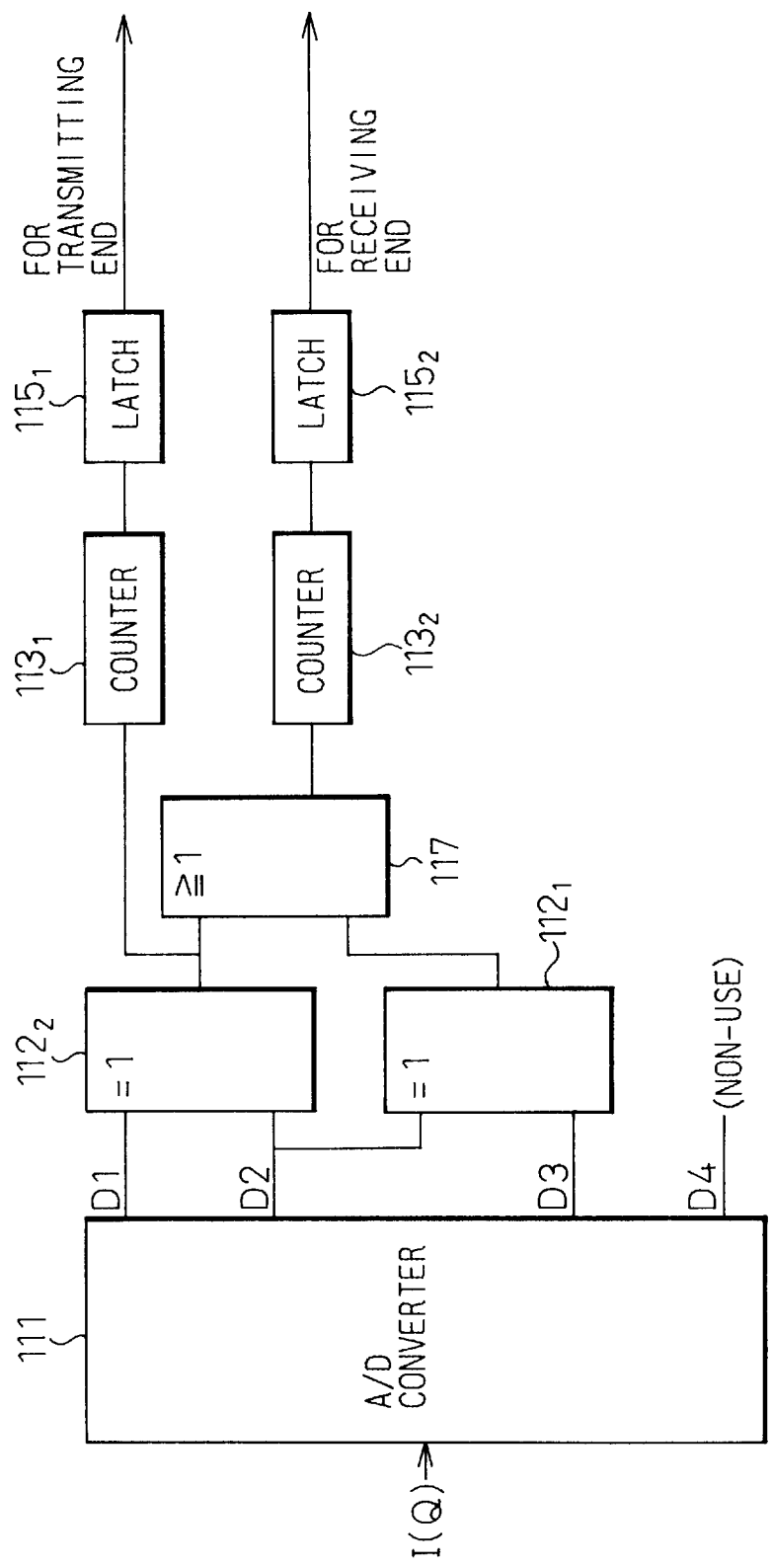

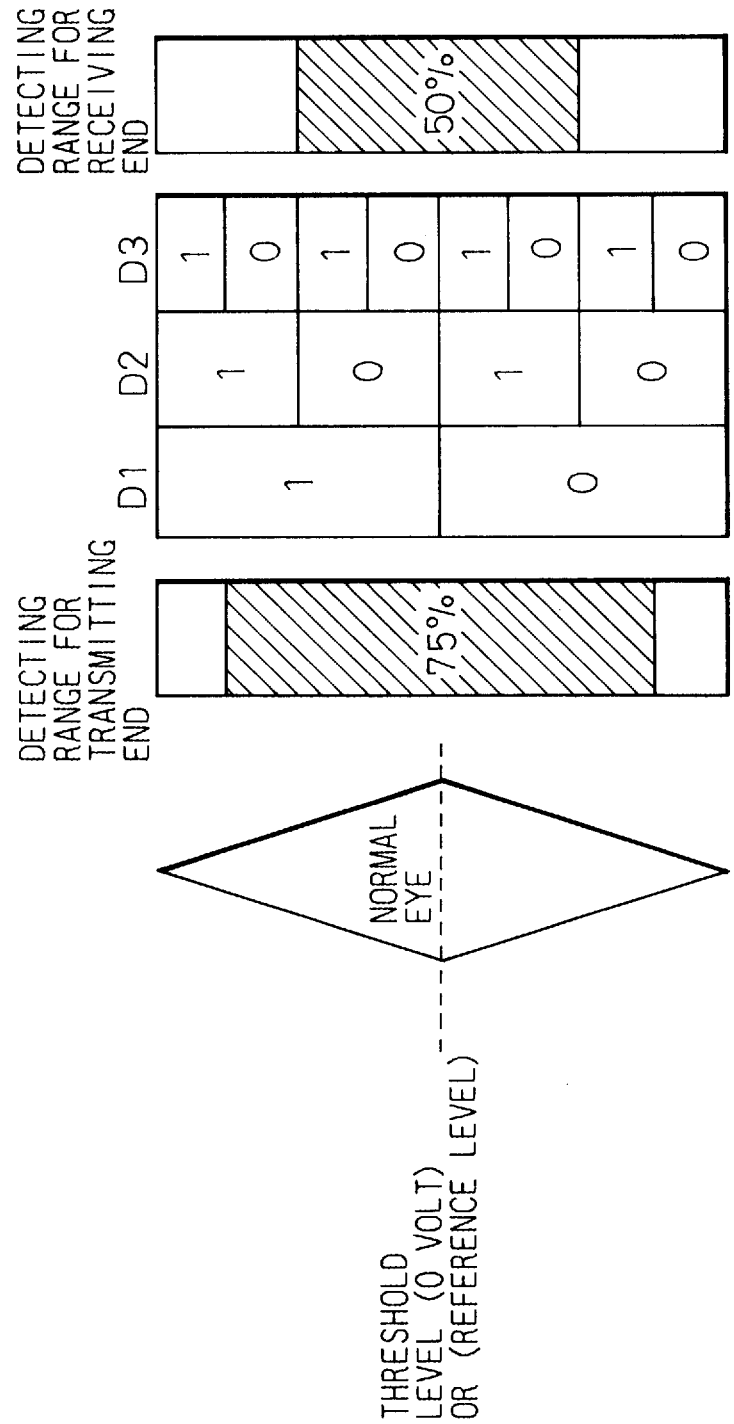

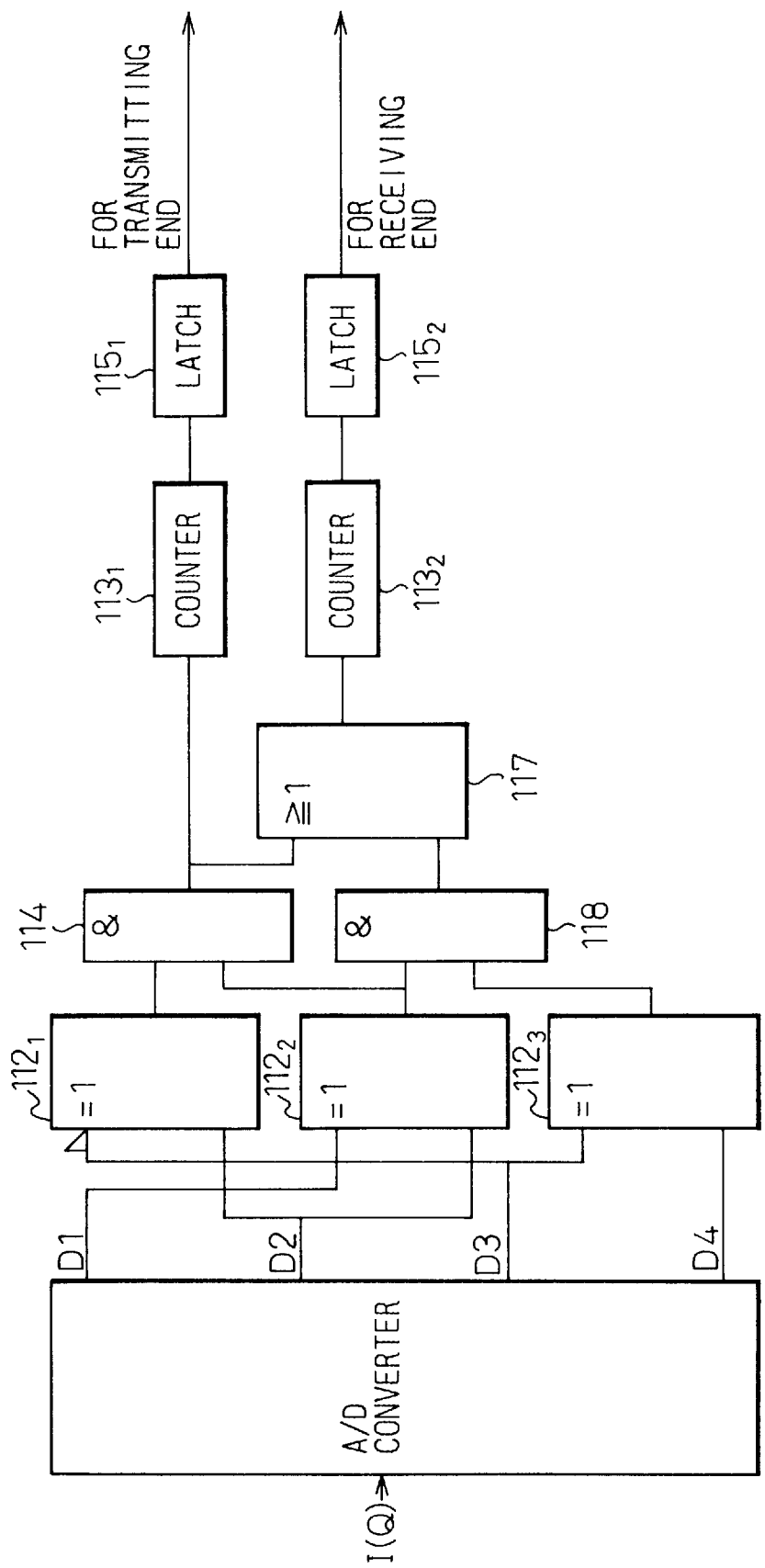

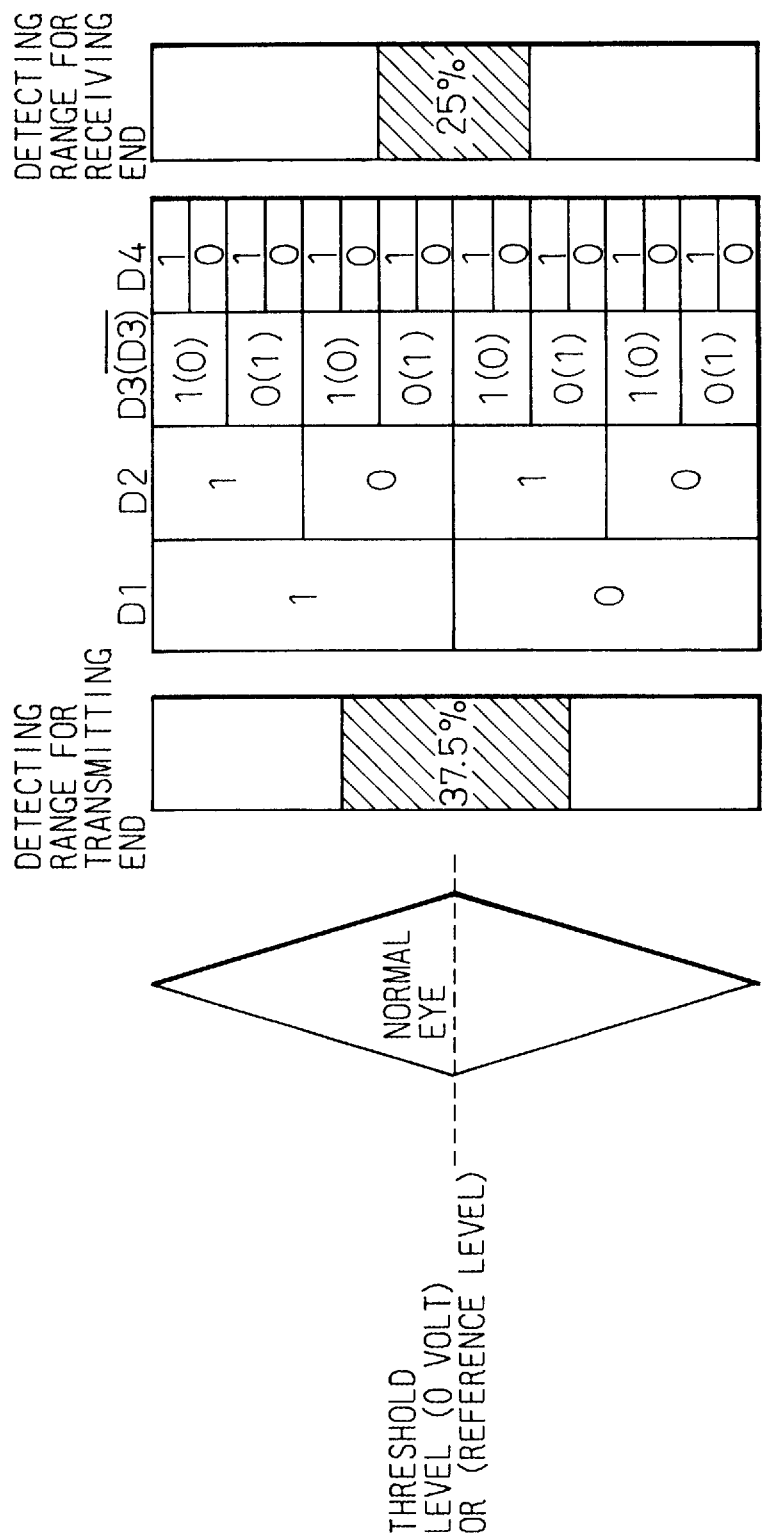

Fig.15E

| INPUT 1 | | INPUT 2 | | OUTPUT | |
|---|---|---|---|---|---|
| MSB1 | LSB1 | MSB2 | LSB2 | $MSB_0$ | $LSB_0$ |
| 0 | 0 | 0 | 0 | 0 | 0 |
| 0 | 0 | 0 | 1 | 0 | 1 |
| 0 | 1 | 0 | 0 | 0 | 1 |
| 0 | 1 | 0 | 1 | 1 | 0 |
| 0 | 0 | 1 | 0 | 1 | 0 |
| 0 | 0 | 1 | 1 | 1 | 1 |
| 0 | 1 | 1 | 0 | 1 | 1 |
| 0 | 1 | 1 | 1 | 1 | 1 |
| 1 | 0 | 0 | 0 | 1 | 0 |
| 1 | 0 | 0 | 1 | 1 | 1 |
| 1 | 1 | 0 | 0 | 1 | 1 |
| 1 | 1 | 0 | 1 | 1 | 1 |
| 1 | 0 | 1 | 0 | 1 | 1 |
| 1 | 0 | 1 | 1 | 1 | 1 |
| 1 | 1 | 1 | 0 | 1 | 1 |
| 1 | 1 | 1 | 1 | 1 | 1 |

Fig.15F

| INPUT 1 | | INPUT 2 | | OUTPUT | |
|---|---|---|---|---|---|
| MSB1 | LSB1 | MSB2 | LSB2 | MSB$_0$ | LSB$_0$ |
| 0 | 0 | 0 | 0 | 0 | 0 |
| 0 | 0 | 0 | 1 | 0 | 1 |
| 0 | 1 | 0 | 0 | 0 | 1 |
| 0 | 1 | 0 | 1 | 0 | 1 |
| 0 | 0 | 1 | 0 | 1 | 0 |
| 0 | 0 | 1 | 1 | 1 | 1 |
| 0 | 1 | 1 | 0 | 1 | 0 |
| 0 | 1 | 1 | 1 | 1 | 1 |
| 1 | 0 | 0 | 0 | 1 | 0 |
| 1 | 0 | 0 | 1 | 1 | 0 |
| 1 | 1 | 0 | 0 | 1 | 1 |
| 1 | 1 | 0 | 1 | 1 | 1 |
| 1 | 0 | 1 | 0 | 1 | 0 |
| 1 | 0 | 1 | 1 | 1 | 1 |
| 1 | 1 | 1 | 0 | 1 | 1 |
| 1 | 1 | 1 | 1 | 1 | 1 |

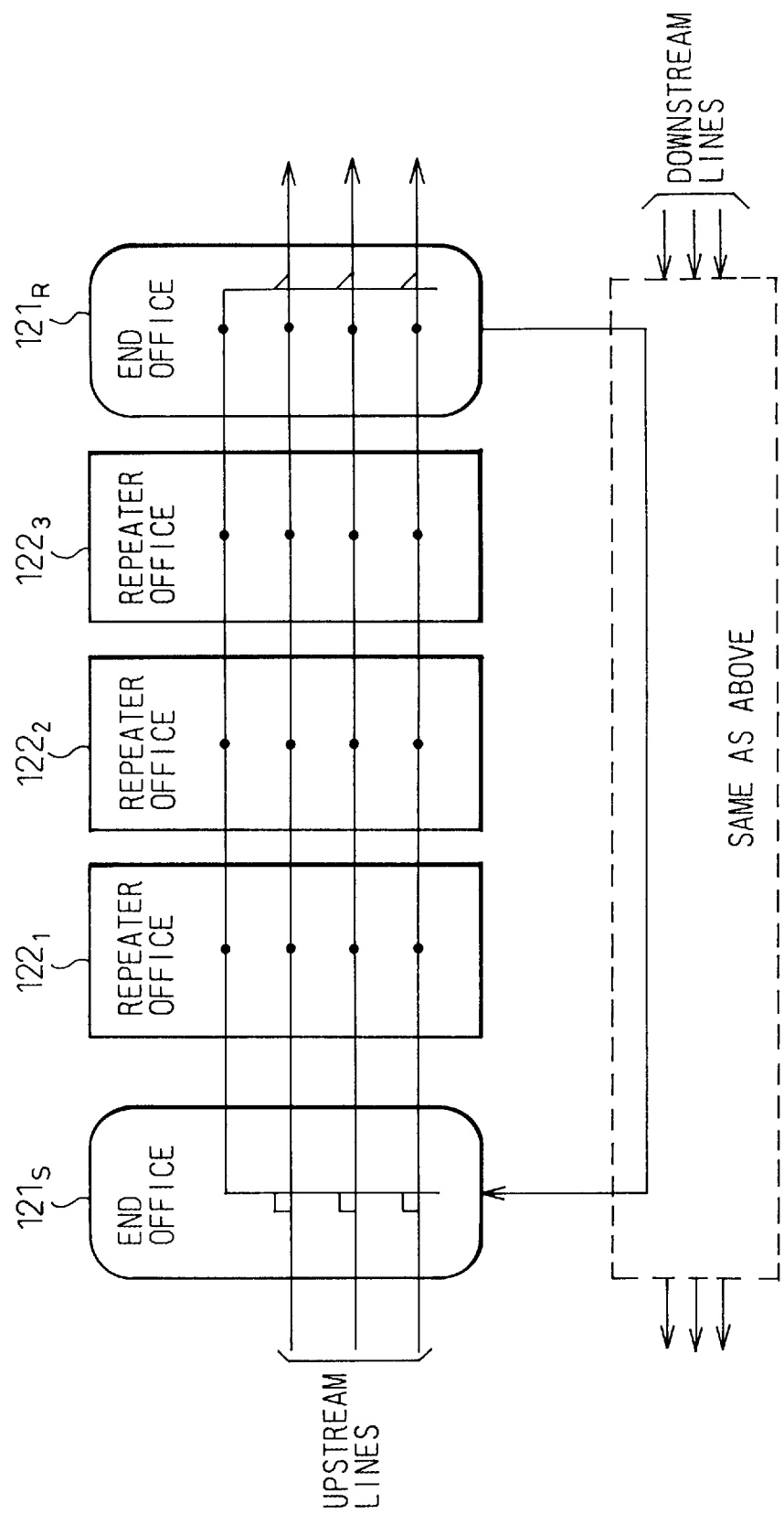

DIGITAL RADIO SYSTEM INCLUDING REPEATER EQUIPMENT, END EQUIPMENT AND RECEIVER

BACKGROUND OF THE INVENTION

1. Field of the Invention

The present invention relates to a digital radio system which forms a high speed digital radio transmission line through a plurality of repeater offices positioned within line-of-sight distances using a microwave band radio frequency, more particularly relates to repeater equipment and end equipment respectively constituting a repeater office and end office in that system and to a receiver mounted in that equipment.

2. Description of the Related Art

The striking advances being made in digital radio transmission technology have led to the use of digital radio systems using microwave band radio frequencies for tandem regenerative repeat operations in both communication lines for domestic trunks and communication lines used for international communication.

In such a digital radio system, as will be explained in detail later with reference to the drawings, there have been the following problems:

(i) When the receiving end recognizes that the bit error rate (BER) is above a certain threshold, a trial of parallel connecting transmission is started, and therefore if a notch occurs successively between adjoining radio transmission lines or the notch causes significant fluctuations in the received field strength, it becomes impossible to secure a sufficient transmission quality for communication services. A situation then arises where the lines are blocked or calls have to be disconnected under predetermined communication control protocols and as a result the quality of the service deteriorates.

(ii) Accordingly attempts at parallel connecting transmission are started after the elapse of a long period of a few tens of milliseconds from the time of occurrence of a notch, so in many cases a large amount of transmission information is sent over the working radio transmission line with a deteriorated transmission quality before the parallel connecting transmission begins and the quality of the transmission temporarily becomes extremely poor.

(iii) When a similar notch occurs at another working radio transmission line after the bit error rate (BER) once exceeds the above threshold, since the standby radio transmission line is not released until the above bit error rate returns to below the threshold, the attempt at parallel connecting transmission will be suspended and the quality of transmission will remarkably fall in many cases.

(iv) When a notch grows at a remarkably high speed in the transmission band of the working radio transmission line, the signature changes rapidly along with the notch growth. Therefore, in the related art where the fact of the bit error rate exceeding the threshold was detected based on the result of a parity check, it was not possible to change over from the working radio transmission line to the standby radio transmission line uninterruptedly.

SUMMARY OF THE INVENTION

Therefore, in consideration of the above problems, the present invention has as its object the provision of a digital radio system including repeater equipment, end equipment, and a receiver which enables early and reliable detection of the occurrence of a notch at each repeater section and efficient maintenance of transmission quality.

To attain the above object, the present invention provides a digital radio system including repeater equipment provided with a plurality of pairs of regenerating devices between the transmitting and receiving ends for individually receiving waves of upstream and downstream routes at repeating points of redundantly configured radio transmission lines formed under a full duplex mode and demultiplexing and extracting the transmission information and control information multiplexed in the received waves, a plurality of pairs of repeating units for multiplexing the transmission information and control information individually extracted by the plurality of pairs of regenerating units and relaying them to the following repeater sections through the redundantly configured radio transmission lines, and a plurality of intersymbol interference measuring means for individually measuring the degree or frequency of intersymbol interference of received waves for one of the upstream and downstream routes, the repeating means corresponding to the one upstream or downstream route among the plurality of pairs of repeating units further including a multiplexing unit for multiplexing the transmission information and control information individually extracted by the regenerating units corresponding to that one route among the plurality of pairs of regenerating units together with information indicative of the degree or frequency of intersymbol interference. This enables the transmission quality to be efficiently maintained.

BRIEF DESCRIPTION OF THE DRAWINGS

The above object and features of the present invention will be more apparent from the following description of the preferred embodiments with reference to the accompanying drawings, wherein:

FIGS. 8A and 8 are views of the frame format of the embodiment of the invention;

FIG. 9 is a view explaining the operation of an embodiment of the invention according to the first aspect;

FIG. 11 is a view of an embodiment of the invention according to the ninth aspect;

FIGS. 12A and 12B are views of an embodiment of the invention according to the tenth aspect;

FIGS. 13A and 13B are views of a first modification of the embodiment shown in FIGS. 12A and 12B;

FIGS. 14A and 14B are views of a second modification of the embodiment shown in FIGS. 12A and 12B;

FIGS. 15A to 15F are views explaining specific examples of the adding/selecting unit shown in FIG. 5;

FIG. 16 is a view of an example of the configuration of a conventional digital radio system;

DESCRIPTION OF THE PREFERRED EMBODIMENTS

Before describing the embodiments of the present invention, the related art and the disadvantages therein will be described with reference to the related figures.

As mentioned above, the striking advances being made in digital radio transmission technology have led to the use of digital radio systems using microwave band radio frequencies for tandem regenerative repeat operations even in both communication lines for domestic trunks and communication lines used for international communication.

FIG. 16 is a view of an example of the configuration of a conventional digital radio system.

In the figure, the end offices $121_S$ and $121_R$ are arranged at the two ends of a plurality (herein, for simplification, the sum of three working lines and one standby line using N+ one protection system) of radio transmission lines. On these three radio transmission lines, three repeater offices $122_1$ to $122_3$ are arranged. Note that these radio transmission lines are each comprised of full duplex lines. Below, however, note will be taken of the upstream transmission line extending from the end office $121_S$ to the end office $121_R$. In FIG. 16, the opposite downstream transmission line is shown by the box shown by the dotted lines. Illustration of the detailed configuration is omitted.

Figure 17:
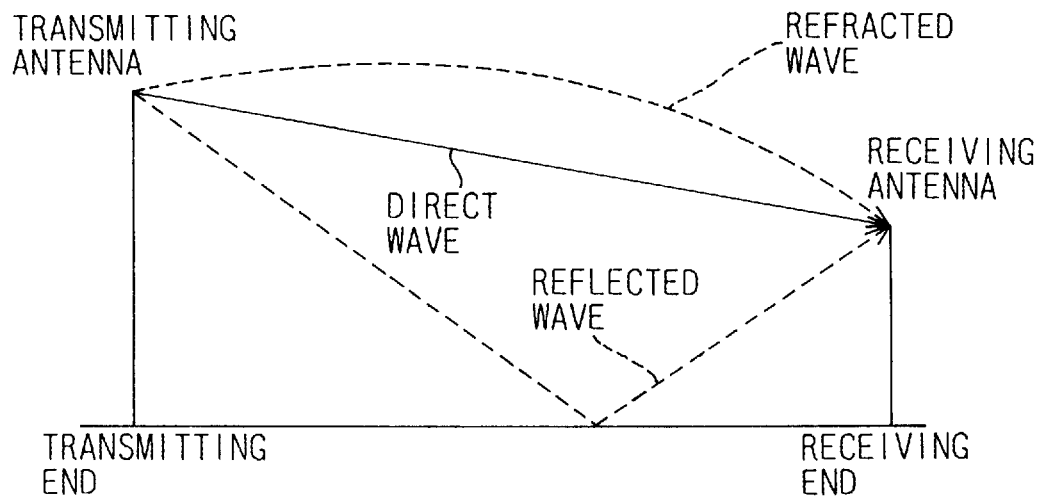
FIG. 17 is a view explaining the cause of occurrence of a notch.

In a digital radio system of such a configuration, the radio transmission lines of the sections (hop) between the end office and the adjoining repeater office and between two adjoining repeater offices are formed under regenerative repeat operations conducted by the repeater offices $122_1$ to $122_3$ at all times. Further, on these radio transmission lines, as shown in FIG. 17, a direct wave which directly reaches the receiving antenna of an office from the antenna of an opposing office over a line-of-sight distance, a reflected wave arriving reflected from the ground etc. of the corresponding section, and a refracted wave occur.

Figure 18:
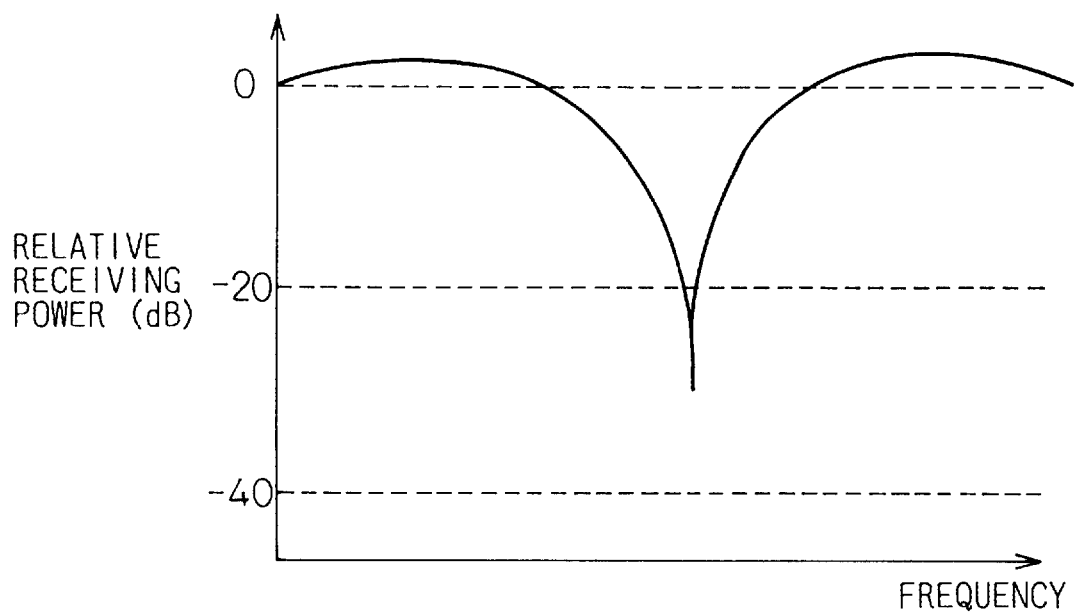
FIG. 18 is a view explaining fluctuations in the receiving power caused by a notch.

The levels of the received fields and the phases of the direct wave, reflected wave, and refracted wave, however, change governed by the characteristics of reflection from the ground surface etc. and the meteorological conditions in the corresponding section and so on, so the received wave, which is obtained as the vector sum of the reflected wave and direct wave, is accompanied by frequency-selective fading (hereinafter referred to as a "notch"), as shown, for example, in FIG. 18.

Figure 19:
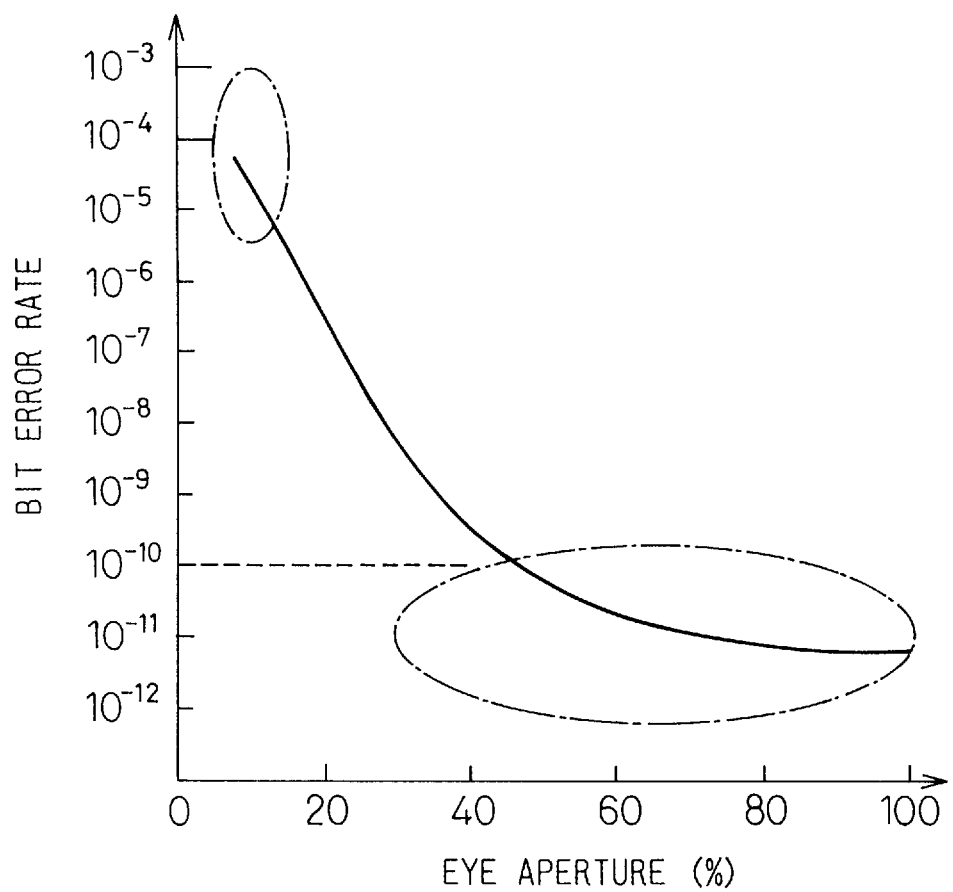
FIG. 19 is a view showing fluctuations in the bit error rate in terms of an eye aperture.

In an upstream radio transmission line, the end office $121_R$ acting as the receiving end performs processing to receive signals and processing to reproduce the transmission information for the individual radio transmission lines and judges the relative magnitude between the bit error rate of the transmission information (here, for simplification, considered obtained based on the true or false logic of the parity bit added to the transmission information) and a predetermined threshold. Note that this threshold, as shown in FIG. 19, is set to "$10^{-5}$" to "$10^{-4}$". Further, when the end office $121^R$ recognizes that the bit error rate has exceeded the above threshold, it sends that fact and identification information of the corresponding radio transmission line (hereinafter referred to as a "request for parallel connecting transmission") to specific predetermined downstream radio transmission lines serving for maintenance and operational use (hereinafter referred to simply as a "control use transmission line").

This request for parallel connecting transmission is constantly watched for by the end office $121_S$ acting as the transmitting end of the upstream radio transmission line. When this request is received through the repeater offices $122_3$ to $122_1$, the end office takes the radio transmission line set for standby use and sends the transmission information to be sent over the working radio transmission line through both the above standby use radio transmission line and the working radio transmission line, shown by the identification information included in the request for parallel connecting transmission. This sending of transmission information is referred to as the "parallel connecting transmission".

On the other hand, the end office $121_R$ acting as the receiving end performs processing adapted to the method of transmission of the radio transmission line on the transmission information obtained from the standby radio transmission line under this parallel connecting transmission so as to minimize the phase difference between the transmission information obtained from the working radio transmission line and the transmission information obtained from the standby radio transmission line, and changes from the working radio transmission line to the standby radio transmission line are uninterrupted so as to avoid any deterioration of the transmission quality caused by the occurrence of the notch.

In this related art, however, when the receiving end recognizes that the bit error rate (BER) is above a certain threshold, a trial of parallel connecting transmission is started, and therefore if notches occur successively between adjoining radio transmission lines or these notches cause significant fluctuations in the received field strength, it becomes impossible to secure a sufficient transmission quality for communication services. A situation then arises where the lines are blocked or calls have to be disconnected under predetermined communication control protocols and as a result the quality of the service deteriorates.

Further, the bit error rate BER at the receiving end is generally expressed as $$BER=k/(m \cdot n)$$

where assuming the number of parity bits added to the transmission information to be "1", the number of bits of parity error in m number of adjoining frames to be k (k<m), and the word length of the transmission information to be transmitted per unit frame to be n. Further, as this number k, use is generally made of "10" so as to enable highly reliable detection of when the bit error rate BER becomes more than the above threshold (here, for simplification, assumed to be "$10^{-5}$"). With this number k, however, the value m·n of the denominator at the right side of the above equation (number of bits to be subjected to the parity check) becomes "$10^6$" and the time t required until the bit error rate BER reaches the above threshold becomes 29.4 msec ($(=10^6/(34\times10^6))$ sec) assuming the transmission rates of the upstream and downstream radio transmission lines are 34 Mbps. Note that this time t actually becomes double that value (can be left the same value even with differential logic by using two parity check bits, but in general the single-bit method is used, so the time doubles) since use is made of the differential coding method as the method of coding for the upstream and downstream radio transmission lines Accordingly, trials at parallel connecting transmission are started after the elapse of a long period of at least several tens of milliseconds from the time of occurrence of a notch, so in many cases a large amount of transmission information is sent over the working radio transmission line with a deteriorated transmission quality before the parallel connecting transmission and the quality of the transmission temporarily becomes extremely poor.

Note that, concerning the above time, when the bit error rate is fixed to $10^{-5}$, double the 29.4 msec of time is necessary for detection, but the actual bit error rate rapidly deteriorates, so the detection time is greatly reduced. The bit error rate at the time of completion of the detection, while depending on fading, becomes for example near $10^{-3}$.

When a similar notch occurs at another working radio transmission line after the bit error rate (BER) once exceeds the above threshold, since the standby radio transmission line is not released until the above bit error rate returns to below the threshold, the attempt at parallel connecting transmission will be suspended and the quality of transmission will remarkably fall in many cases.

Figure 20:
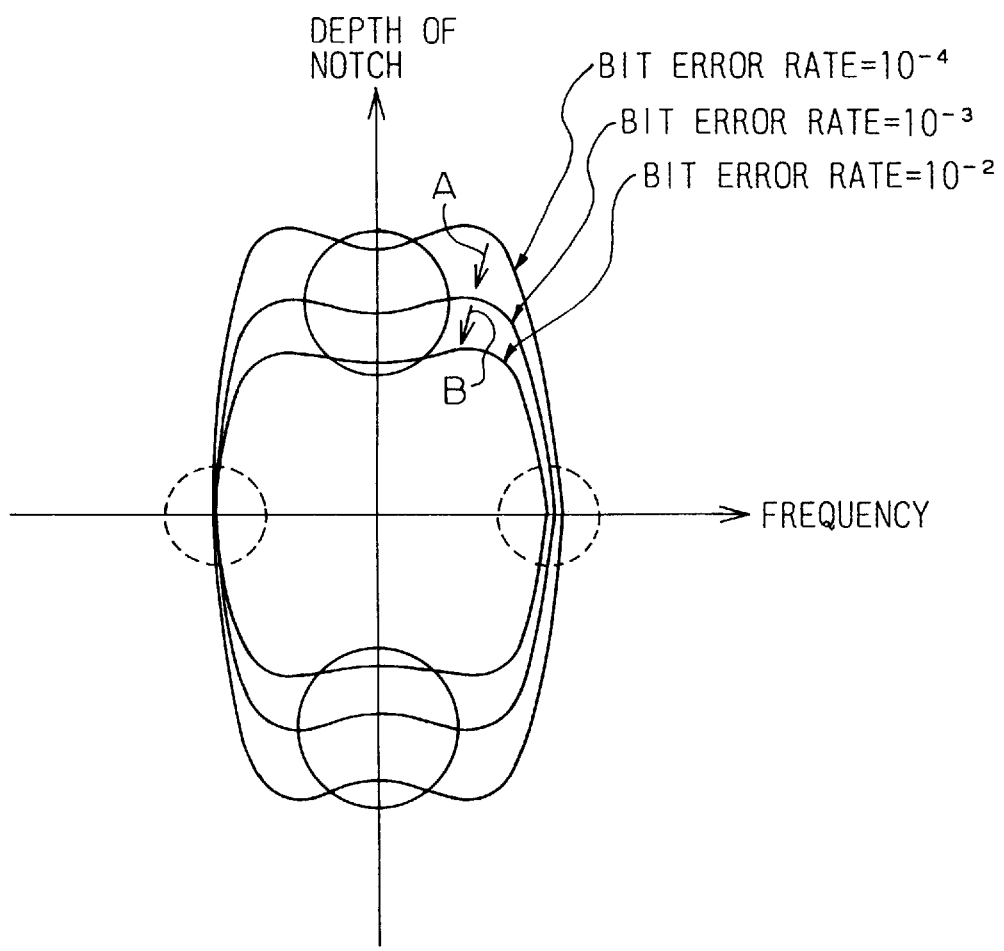
FIG. 20 is a view showing changes in the signature along with notch growth.

Further, the signature generally changes most rapidly as shown by the arrows A and B in FIG. 20 when the notch moves at a high speed on the frequency axis.

When a notch grows at a remarkably high speed in the transmission band of the working radio transmission line, the signature changes rapidly along with the notch growth as shown by the arrows in FIG. 20. In the related art where the fact of the bit error rate exceeding the threshold was detected based on the result of a parity check, it was not possible to change from the working radio transmission line to the standby radio transmission line without interruption.

The present invention provides a digital radio system including repeater equipment, end equipment, and a receiver which enables early and reliable detection of the occurrence of notches at each repeater section and efficient maintenance of transmission quality.

Figure 1:
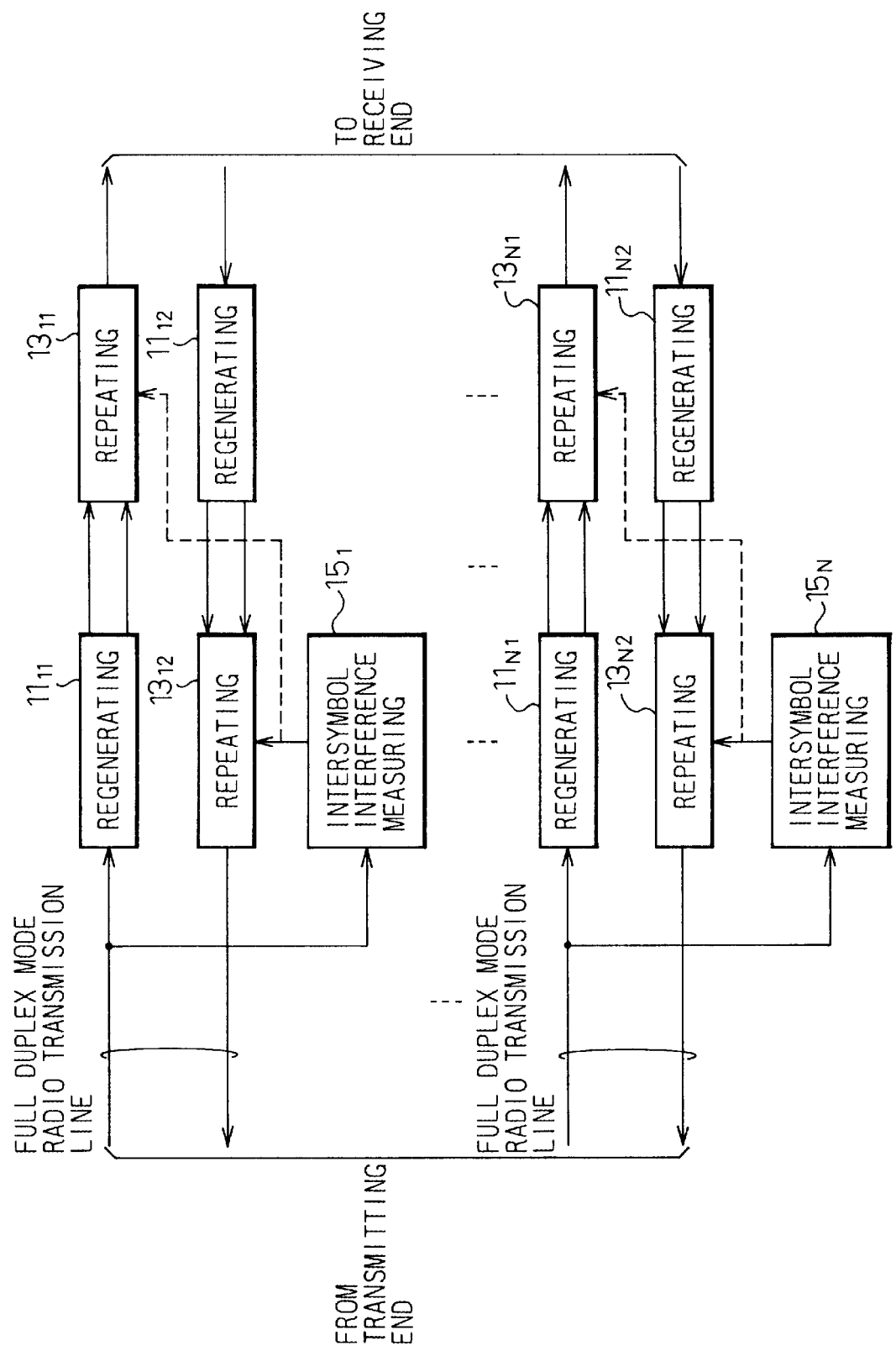
FIG. 1 is a block diagram of the principle of the invention according to the first to sixth aspects and the tenth aspect.

FIG. 1 is a block diagram of the principle of the invention according to the first to sixth aspects and the tenth aspect.

The invention according to the first aspect provides repeater equipment provided with a plurality of pairs of regenerating means $11_{11}$, $11_{12}$ to $11_{N1}$, $11_{N2}$ between transmitting and receiving ends for individually receiving waves of upstream and downstream routes of the radio transmission lines at repeating points of redundantly configured radio transmission lines formed under a full duplex mode and demultiplexing and extracting the transmission information and control information multiplexed in the received waves; a plurality of pairs of repeating means $13_{11}$, $13_{12}$ to $13_{N1}$, $13_{N2}$ for multiplexing the transmission information and control information individually extracted by the plurality of pairs of regenerating means $11_{11}$, $11_{12}$ to $11_{N1}$, $11_{N2}$ and relaying them to the following repeater sections through the redundantly configured radio transmission lines; and a plurality of intersymbol interference measuring means $15_1$ to $15_N$ for individually monitoring the increment and decrement in the eye apertures of the received waves and measuring the degree or frequency of intersymbol interference for one of the upstream and downstream routes of the redundantly configured radio transmission lines; the repeating means corresponding to the one upstream or downstream route among the plurality of pairs of repeating means $13_{11}$, $13_{12}$ to $13_{N1}$, $13_{N2}$ further including means for multiplexing the transmission information and control information individually extracted by the regenerating means corresponding to that one route among the plurality of pairs of regenerating means $11_{11}$, $11_{12}$ to $11_{N1}$, $11_{N2}$ together with information indicative of the degree or frequency of intersymbol interference individually measured by the plurality of intersymbol interference measuring means $15_1$ to $15_N$.

More specifically, in the repeater equipment of the invention according to the first aspect, the regenerating means $11_{11}$, $11_{12}$ to $11_{N1}$, $11_{N2}$ and the repeating means $13_{11}$, $13_{12}$ to $13_{N1}$, $13_{N2}$ are arranged between the transmitting end and the receiving end at the repeating points of the full duplex redundantly configured radio transmission lines and perform regenerative repeating in parallel on the upstream and downstream routes of these radio transmission lines.

The intersymbol interference measuring means $15_1$ to $15_N$ measure the degree or frequency of intersymbol interference of the received waves by individually monitoring the increment and decrement in the eye apertures of the received waves of one of the upstream and downstream routes of these radio transmission lines. The repeating means corresponding to that one upstream or downstream route of the individual radio transmission lines among the repeating means $13_{11}$, $13_{12}$ to $13_{N1}$, $13_{N2}$ multiplex information indicative of the degree or frequency of intersymbol interference individually measured by the intersymbol interference measuring means $15_1$ to $15_N$ together with the transmission information and control information individually extracted by the regenerating means corresponding to that one route among the regenerating means $11_{11}$, $11_{12}$ to $11_{N1}$, $11_{N2}$.

That is, information indicative of the degree or frequency of intersymbol interference measured for the received waves of the upstream (or downstream) route is transmitted on the upstream (or downstream) route in the full duplex redundantly configured radio transmission lines, so the state of the fluctuation of the transmission characteristics in the repeater section preceding the repeater equipment according to the present invention is quickly and reliably notified to the receiving end.

Accordingly, at the receiving end, it is possible to smoothly reconstruct the redundantly configured radio transmission lines and control the communication based on a predetermined protocol in accordance with the state of fluctuation of the transmission characteristics notified in this way.

The invention according to the second aspect provides the repeater equipment of the invention according to the first aspect wherein the repeating means corresponding to the other upstream or downstream route among the plurality of pairs of repeating means $13_{11}$, $13_{12}$ to $13_{N1}$, $13_{N2}$ further include means for multiplexing the transmission information and control information individually extracted by the regenerating means corresponding to that other route among the plurality of pairs of regenerating means $11_{11}$, $11_{12}$ to $11_{N1}$, $11_{N2}$ together with information indicative of the degree or frequency of intersymbol interference individually measured by the plurality of intersymbol interference measuring means $15_1$ to $15_N$.

More specifically, the repeater equipment of the invention according to the second aspect provides repeater equipment of the invention according to the first aspect, wherein the repeating means corresponding to the other of the upstream and downstream routes of the individual radio transmission lines among the repeating means $13_{11}$, $13_{12}$ to $13_{N1}$, $13_{N2}$ multiplex information indicative of the degree or frequency of intersymbol interference individually measured by the intersymbol interference measuring means $15_1$ to $15_N$ together with the transmission information and control information individually extracted by the regenerating means corresponding to that other route among the regenerating means $11_{11}$, $11_{12}$ to $11_{N1}$, $11_{N2}$.

That is, information indicative of the degree or frequency of intersymbol interference measured for the received waves of the upstream (or downstream) route is transmitted on the downstream (or upstream) route in the full duplex redundantly configured radio transmission lines, so the state of the fluctuation of the transmission characteristics in the repeater section preceding the repeater equipment of the present invention is quickly and reliably notified to the transmitting end.

Accordingly, at the transmitting end, it is possible to smoothly reconstruct the redundantly configured radio transmission lines and control the communication based on a predetermined protocol in accordance with the state of fluctuation of the transmission characteristics notified in this way.

The invention according to the third aspect provides repeater equipment comprising a plurality of pairs of regenerating means $11_{11}$, $11_{12}$ to $11_{N1}$, $11_{N2}$ between transmitting and receiving ends for individually received waves of upstream and downstream routes of redundantly configured radio transmission lines formed under a full duplex mode at repeating points of the radio transmission lines and demultiplexing and extracting the transmission information and control information multiplexed in the received waves; a plurality of pairs of repeating means $13_{11}$, $13_{12}$ to $13_{N1}$, $13_{N2}$ for multiplexing the transmission information and control information individually extracted by the plurality of pairs of regenerating means $11_{11}$, $11_{12}$ to $11_{N1}$, $11_{N2}$ and relaying them to the following repeater sections through the redundantly configured radio transmission lines; and a plurality of intersymbol interference measuring means $15_1$, to $15_N$ for individually monitoring the increment and decrement in the eye apertures with respect to the received waves, and measuring the degree or frequency of intersymbol interference of received waves for one of the upstream and downstream routes of the redundantly configured radio transmission lines, the repeating means corresponding to the other upstream or downstream route among the plurality of pairs of repeating means $13_{11}$, $13_{12}$ to $13_{N1}$, $13_{N2}$ further including means for multiplexing the transmission information and control information individually extracted by the regenerating means corresponding to that other route among the plurality of pairs of regenerating means $11_{11}$, $11_{12}$ to $11_{N1}$, $11_{N2}$ together with information indicative of the degree or frequency of intersymbol interference individually measured by the plurality of intersymbol interference measuring means $15_1$ to $15_N$.

More specifically, in the repeater equipment of the invention according to the third aspect, the regenerating means $11_{11}$, $11_{12}$ to $11_{N1}$, $11_{N2}$ and the repeating means $13_{11}$, $13_{12}$ to $13_{N1}$, $13_{N2}$ are arranged between the transmitting end and the receiving end at the repeating points of the full duplex redundantly configured radio transmission lines and perform regenerative repeating operations in parallel on the upstream and downstream routes of these radio transmission lines.

The intersymbol interference measuring means $15_1$ to $15_N$ measure the degree or frequency of intersymbol interference of the received waves by individually monitoring the increment and decrement in the eye apertures with respect to the received waves of one of the upstream and downstream routes of these radio transmission lines. The repeating means corresponding to the other upstream or downstream route among the repeating means $13_{11}$, $13_{12}$ to $13_{N1}$, $13_{N2}$ multiplex information indicative of the degree or frequency of intersymbol interference individually measured by the intersymbol interference measuring means $15_{11}$ to $15_N$ together with the transmission information and control information individually extracted by the regenerating means corresponding to that other route among the regenerating means $11_{11}$, $11_{12}$ to $11_{N1}$, $11_{N2}$.

That is, information indicative of the degree or frequency of intersymbol interference measured for the received waves of the upstream (or downstream) route is returned and transmitted directly on the downstream (or upstream) route in the full duplex redundantly configured radio transmission lines, so the state of the fluctuation of the transmission characteristics in the repeater section preceding the repeater equipment of the present invention is quickly and reliably notified to the transmitting end.

Further, the degree or frequency of intersymbol interference shows light deterioration of the transmission characteristics before the state where the bit error rate remarkably increases at the receiving end.

Accordingly, at the transmitting end, it is possible to smoothly reconstruct the redundantly configured radio transmission lines and control the communication based on a predetermined protocol in accordance with the state of fluctuation of the transmission characteristics notified in this way.

The invention according to the fourth aspect provides repeater equipment of the invention according to any one of the first to third aspects wherein the plurality of pairs of repeating means $13_{11}$, $13_{12}$ to $13_{N1}$, $13_{N2}$ include means for obtaining the sum of the degree or frequency of intersymbol interference shown by the information multiplexed together with the transmission information and control information and the degree or frequency of intersymbol interference measured by the intersymbol interference measuring means before multiplexing the same.

More specifically, the repeater equipment of the invention according to the fourth aspect provides repeater equipment of the invention according to any one of the first to third aspects wherein the repeating means $13_{11}$, $13_{12}$ to $13_{N1}$, $13_{N2}$ obtain the sum of the degree or frequency of intersymbol interference shown by the information multiplexed together with the transmission information and control information sent from the preceding repeater section and the degree or frequency of intersymbol interference measured by the intersymbol interference measuring means corresponding to that repeater section among the intersymbol interference measuring means $15_1$ to $15_N$, multiplex the information indicative of the above sum with the transmission information and control information, and transmit the multiplexed information to the following transmission section and/or preceding transmission section.

That is, information indicative of the sum of the degree or frequency of intersymbol interference measured in each preceding repeater section of the upstream (downstream) routes of the full duplex redundantly configured radio transmission lines is quickly and reliably notified to the receiving end and/or the transmitting end through the upstream and/or downstream routes.

Accordingly, at the transmitting end and/or receiving end, it is possible to smoothly reconstruct the redundantly configured radio transmission lines and control the communication based on a predetermined protocol in accordance with the state of fluctuation of the transmission characteristics notified in this way.

The invention according to the fifth aspect provides repeater equipment of the invention according to any one of the first to third aspects wherein the control information includes information indicative of the degree or frequency of intersymbol interference transmitted by the repeater office and the plurality of pairs of repeating means $13_{11}$, $13_{12}$ to $13_{N1}$, $13_{N2}$ include means for limiting the degree or frequency of intersymbol interference to be multiplexed in the transmission information to the one with the larger degree or frequency among the degree or frequency of intersymbol interference included in the control information and the degree or frequency of intersymbol interference measured by the intersymbol interference measuring means.

More specifically, in the repeater equipment of the invention according to the fifth aspect, an adjoining repeater office through a preceding repeater section along a radio transmission line sends information indicative of the degree or frequency of intersymbol interference which it finds to the following repeater section as control information. The repeating means $13_{11}$, $13_{12}$ to $13_{N1}$, $13_{N2}$ constituting the repeater equipment of the invention according to any one of the first to third aspects compare the degree or frequency of intersymbol interference received from the preceding repeater interference in this wain this way with the degree or frequency of intersymbol interference measured by the intersymbol interference measuring means corresponding to that repeater section among the intersymbol interference measuring means $15_1$ to $15_N$, multiplex the one with the larger degree or frequency among the two as control information with the transmission information, and send the multiplexed information to the preceding transmission section and/or following transmission section.

That is, the largest value of degree or frequency among the degree or frequency of intersymbol interference measured in each preceding repeater section in the upstream (downstream) routes of the full duplex redundantly configured radio transmission lines is quickly and reliably notified to the receiving end and/or the transmitting end through the upstream and/or downstream routes of the following repeater section.

Accordingly, at the transmitting end and/or receiving end, it is possible to smoothly reconstruct the redundantly configured radio transmission lines and control the communication based on a predetermined protocol in accordance with the state of fluctuation of the transmission characteristics notified in this way.

The invention according to the sixth aspect provides repeater equipment of the invention according to any one of the first to third aspects wherein the degree or frequency of intersymbol interference is given by binary information or multilevel information showing discretely the conditions for the transmitting end or receiving end to start a predetermined communication control processing.

More specifically, the repeater equipment of the invention according to the sixth aspect provides repeater equipment of the invention according to any one of the first to third aspects wherein the degree or frequency of intersymbol interference is given by binary information or multilevel information showing discretely the conditions for the transmitting end and/or receiving end to start a predetermined communication control processing.

That is, at the transmitting end, after receiving the discrete intersymbol interference information, it starts a parallel connecting transmission, under the condition where no request for a parallel connecting transmission is issued from the receiving end.

On the other hand, at the receiving end, it advances to the switching processing for selecting one of the two sets of the information transmitted in parallel from the transmitting end after receiving the above discrete intersymbol interference information.

The methods for performing the above switching processing at the receiving end are as follows.

(1) It starts the switching processing only due to a BER alarm based on a parity check.
(2) It gives a priority, in starting the switching process, to a BER alarm based on a parity check, however, if no BER alarm is issued from any repeating sections, it starts the switching processing due to the intersymbol interference information.
(3) In the case of a simplified radio device having no parity check function, it starts the switching processing due to the intersymbol interference information.
(4) Further, as a negative method, there is a method for only monitoring a radio wave propagation state over the radio transmission line. In this case, the switching processing, at the receiving end, is not performed. Therefore, the parallel connecting transmission at the transmitting end is not performed, accordingly.

Accordingly, at the transmitting end and/or receiving end, it is possible to smoothly reconstruct the redundantly configured radio transmission lines and control the communication based on a predetermined protocol in accordance with the state of fluctuation of the transmission characteristics notified as the degree or frequency of intersymbol interference.

Figure 2:
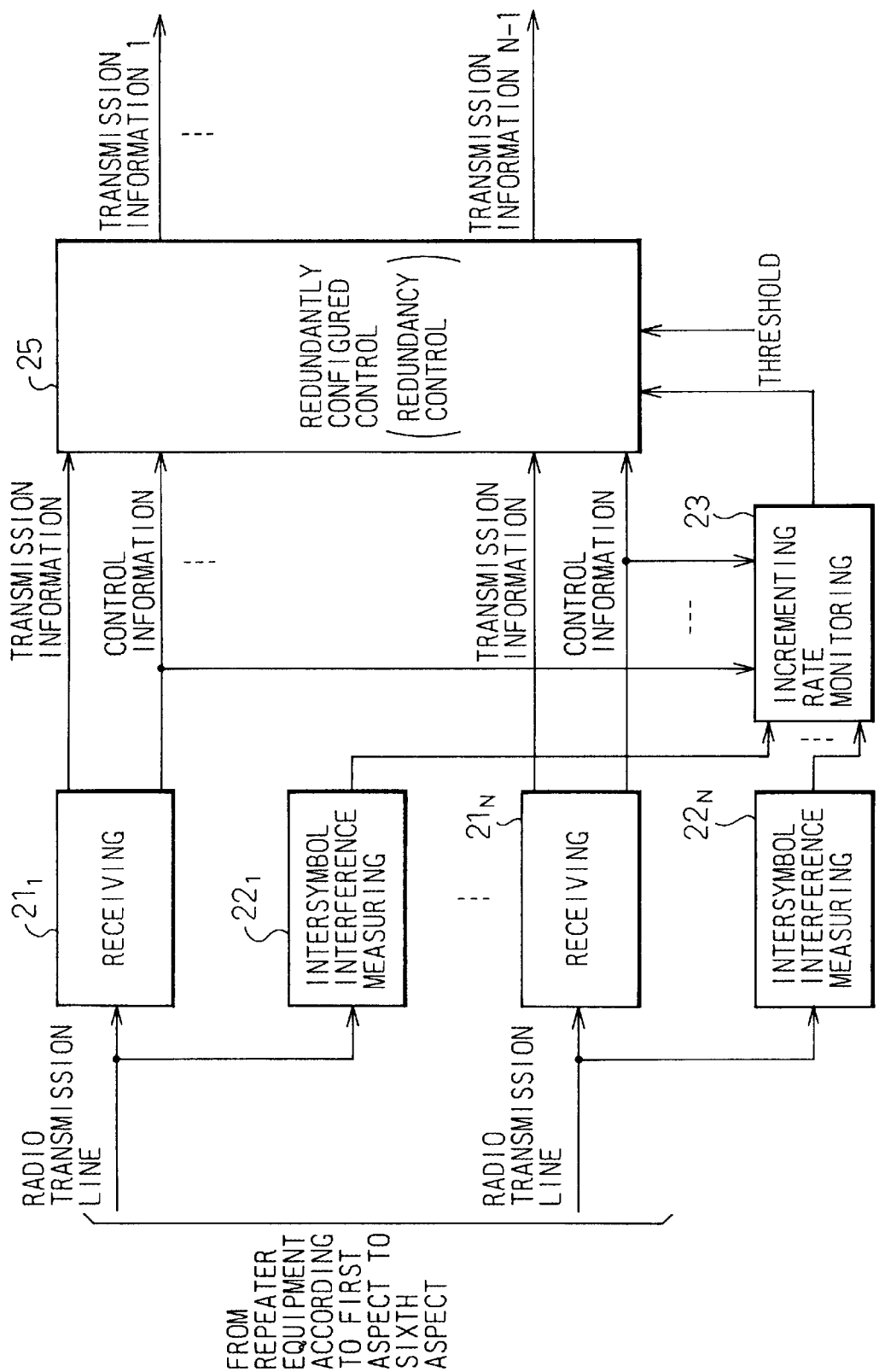
FIG. 2 is a block diagram of the principle of the invention according to the seventh aspect.

FIG. 2 is a block diagram of the principle of the invention according to the seventh aspect.

The invention according to the seventh aspect provides end equipment comprising a plurality of receiving means $21_1$ to $21_N$ for receiving and extracting for every radio transmission line transmission information and control information regeneratively repeated by repeater equipment of the invention according to any one of the first to sixth aspects and information indicative of a degree or frequency of intersymbol interference regeneratively repeated by the same; a plurality of pairs of intersymbol interference measuring means $22_1$ to $22_N$ for individually monitoring the increment and decrement of eye apertures of received waves for the radio transmission lines and measuring the degree or frequency of intersymbol interference; incrementing rate monitoring means 23 for obtaining for each radio transmission line the sum of the degree or frequency of intersymbol interference given as the control information extracted by the plurality of receiving means $21_1$ to $21_N$ or given as information multiplexed together with the control information and the degree or frequency of intersymbol interference measured by the intersymbol interference measuring means $22_1$ to $22_N$ and differentiating the sum so as to obtain the incrementing rate of the sum; and redundancy control means 25 for finding for each radio transmission line the relative magnitude between the sum obtained by the incrementing rate monitoring means 23 and a predetermined threshold and performing control for establishing parallel connecting transmission for the radio transmission line where the former exceeds the latter, the redundancy control means 25 including means for comparing for each radio transmission line the incrementing rate obtained by the incrementing rate monitoring means 23 and giving priority to control for establishment of parallel connecting transmission in the order of the largest incrementing rate down.

More specifically, in the end equipment of the invention according to the seventh aspect, the receiving means $21_1$ to $21_N$ receive and extract for every radio transmission line transmission information and control information regeneratively repeated by repeater equipment of the invention according to any one of the first to sixth aspects and information indicative of a degree or frequency of intersymbol interference regeneratively repeated by the same. The intersymbol interference measuring means $22_1$ to $22_N$ individually monitor the increment and decrement of eye apertures of received waves for the radio transmission lines and measure the degree or frequency of intersymbol interference. The incrementing rate monitoring means 23 finds the degree or frequency of intersymbol interference measured in this way and the degree or frequency of intersymbol interference given as control information extracted by the plurality of receiving means $21_1$ to $21_N$ or given as information multiplexed together with the control information, obtains the sum of the two for each radio transmission line, and differentiates the result so as to obtain the incrementing rate of the sum. The redundancy control means 25 finds for each radio transmission line the result of relative magnitude between the degree or frequency of intersymbol interference and the predetermined threshold and performs the control necessary for establishing parallel connecting transmission for the radio transmission line where the former exceeds the latter. The above means 25 compares for each radio transmission line the incrementing rate obtained in this way and gives priority to control in the order of the largest incrementing rate down.

That is, when the transmission characteristics of the plurality of radio transmission lines fluctuate, with regard to the control for parallel connecting transmission, priority is given to the route where the degree or frequency of intersymbol interference caused by the fluctuation of the transmission characteristics increases fastest, so the possibility of remarkable deterioration of the transmission quality is suppressed.

Figure 3:
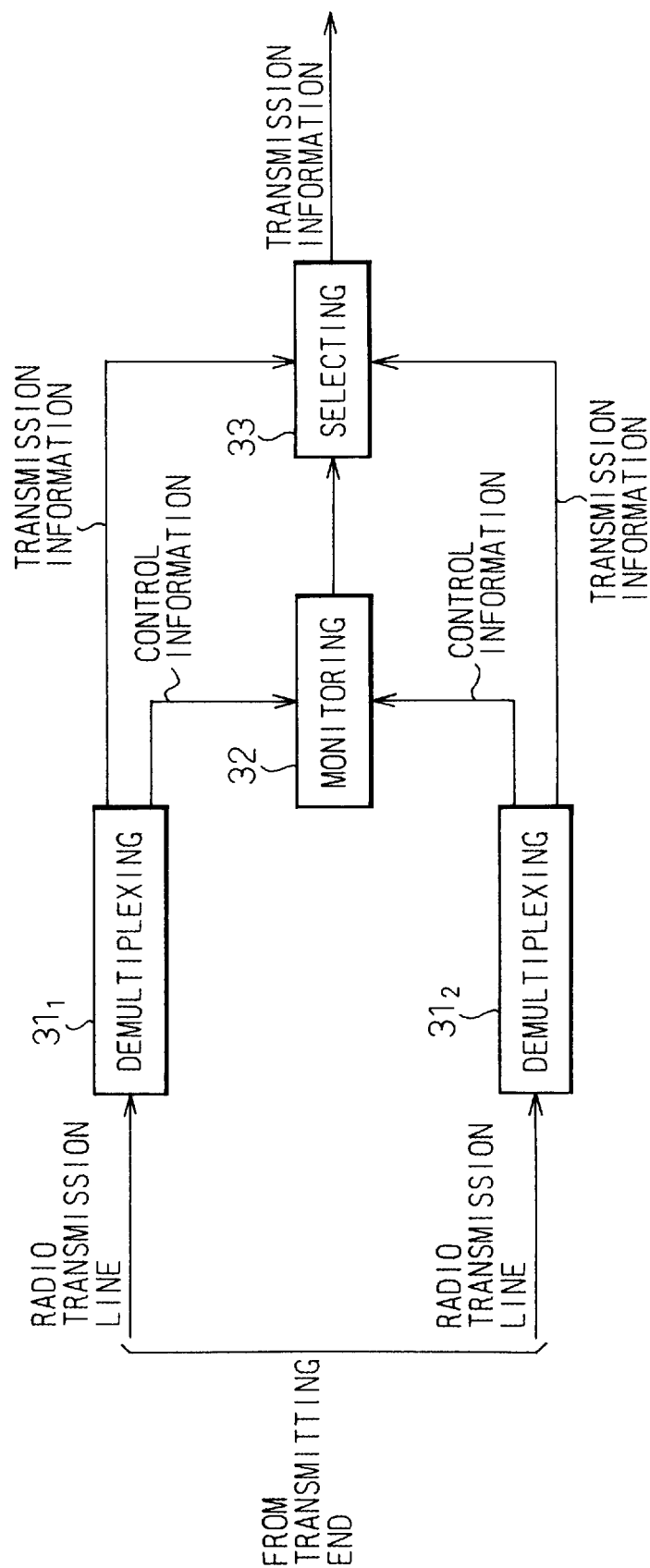
FIG. 3 is a block diagram of the principle of the invention according to the eighth aspect.

FIG. 3 is a block diagram of the principle of the invention according to the eighth aspect.

The invention according to the eighth aspect provides end equipment comprising a plurality of the demultiplexing means $31_1$ and $31_2$ for demultiplexing transmission information and control information including information indicative of the degree or frequency of intersymbol interference measured by intersymbol interference measuring means, both sets of information are regeneratively repeated through repeater equipment of the invention according to any one of the first to sixth aspects from the duplexed radio transmission lines parallel connected for transmission at all times by a transmitting end; monitoring means 32 for comparing the sums of the degree or frequency of intersymbol interference demultiplexed by the plurality of demultiplexing means $31_1$ and $31_2$ and the degree or frequency of intersymbol interference measured by the intersymbol interference measuring means for the duplexed radio transmission lines and finding the radio transmission line with the smaller value of the degree or frequency among the radio transmission lines; and selecting means 33 for selecting the transmission information from the radio transmission line found by the monitoring means 32 from among the transmission information demultiplexed for each radio transmission line by a plurality of the demultiplexing means $31_1$ and $31_2$.

More specifically, in the end equipment of the invention according to the eighth aspect, the repeater equipment of the invention according to any one of the first to sixth aspects is arranged on radio transmission lines duplexed and used at all times for parallel connecting transmission by the transmitting end. The demultiplexing means $31_1$ and $31_2$ individually receive and demultiplex transmission information, control information, and information indicative of the degree or frequency of intersymbol interference regeneratively repeated through the repeater equipment. The monitoring means 32 compares the degrees or frequencies of intersymbol interference included in the demultiplexed information for each radio transmission line in this way and finds the transmission line with the smallest degree or frequency from among the duplexed transmission lines. The selecting means 33 selects the transmission information found by the monitoring means 32 from among the transmission information demultiplexed for each radio transmission line by the demultiplexing means $31_1$ and $31_2$ at timings adapted to the method of transmission of the information.

That is, since the transmission information is obtained through the transmission line with the smaller degree of intersymbol interference in the range of normal results of a parity check among the duplexed radio transmission lines, it is possible to maintain the transmission quality high and keep the reliability of the transmission line good not only when the transmission characteristics differ significantly among the radio transmission lines, but also when the transmission characteristics are all good.

Figure 4:
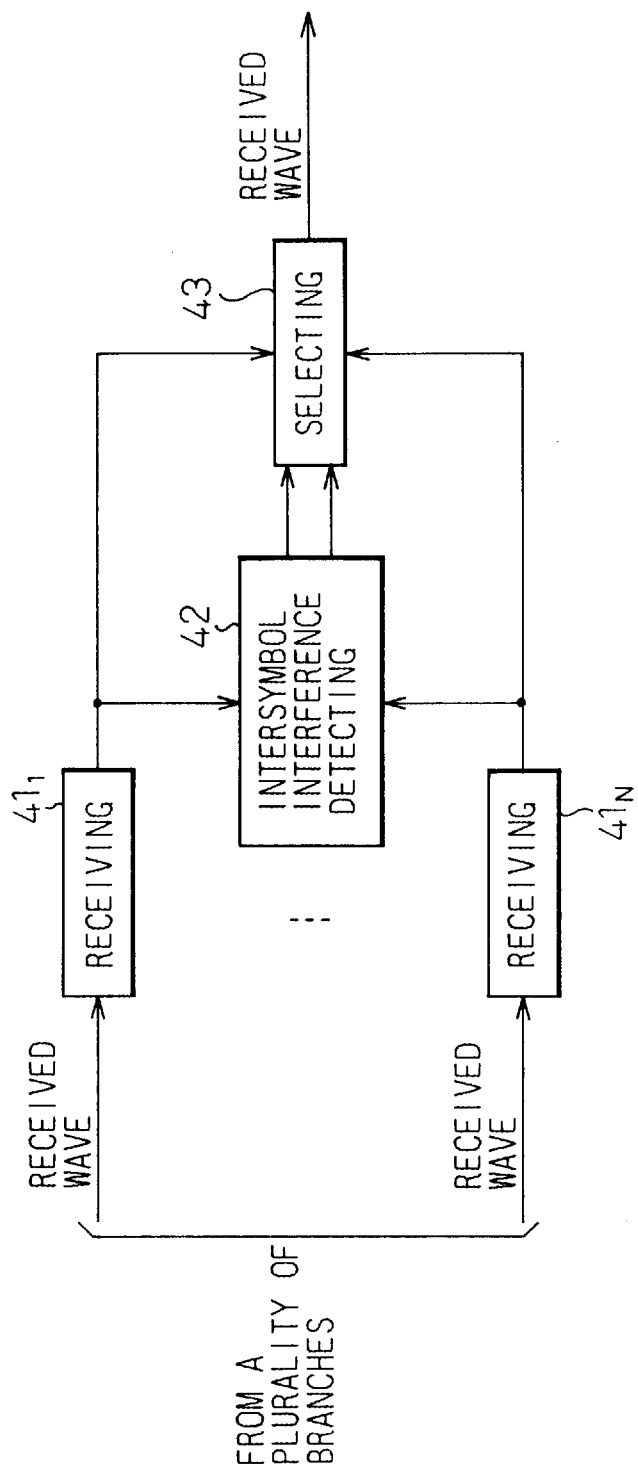
FIG. 4 is a block diagram of the principle of the invention according to the ninth aspect.

FIG. 4 is a block diagram of the principle of the invention according to the ninth aspect.

The invention according to the ninth aspect provides a receiver comprising a plurality of receiving means $41_1$ to $41_N$ for receiving waves individually received from a plurality of branches; intersymbol interference detecting means 42 for detecting a degree or frequency of intersymbol interference for the received waves individually received by the plurality of receiving means $41_1$ to $41_N$; and selecting means 43 for comparing the degrees or frequencies of intersymbol interference measured by the intersymbol interference detecting means 42 among the plurality of branches, finding the branch exhibiting the smallest value, and selecting the received wave from that smallest value branch from among the received waves individually received by the plurality of receiving means $41_1$ to $41_N$.

More specifically, in the receiver of the invention according to the ninth aspect, the receiving means $41_1$ to $41_N$ receive waves from a plurality of branches; while the intersymbol interference detecting means 42 measures the degree or frequency of intersymbol interference for the waves individually received by the receiving means $41_1$ to $41_N$. The selecting means 43 compare the degrees or frequencies of intersymbol interference measured in this way among the plurality of branches, finds the branch exhibiting the smallest value, and selects the received wave from that smallest value branch from among the waves individually received by receiving means $41_1$ to $41_N$.

That is, since the received waves are given in order through the branches with the smaller degrees and frequencies of intersymbol interference among the plurality of branches, good transmission characteristics can be maintained with high reliability compared with the space diversity method where branches are switched when the transmission quality falls below a predetermined value.

The invention according to the tenth aspect provides repeater equipment of the invention according to the second aspect wherein the intersymbol interference measuring means $15_1$ to $15_N$ include means for showing the degree or frequency of intersymbol interference measured in terms of a relative magnitude with two predetermined different thresholds and the plurality of pairs of repeating means $13_{11}$, $13_{12}$ to $13_{N1}$, $13_{N2}$ use as the degree or frequency of intersymbol interference to be multiplexed with the transmission information and control information extracted by regenerating means corresponding to that one upstream or downstream route of the radio transmission lines among the plurality of pairs of regenerating means $11_{11}$, $11_{12}$ to $11_{N1}$, $11_{N2}$ the one shown by the intersymbol interference measuring means as a result of the comparison of the relative magnitude with the larger of the two different thresholds and use as the degree or frequency of intersymbol interference to be multiplexed with the transmission information and control information extracted by the regenerating means corresponding to the other upstream or downstream route the one shown by the intersymbol interference measuring means $15_1$ to $15_N$ as a result of the comparison of the relative magnitude with the smaller of the two different thresholds.

More specifically, the repeater equipment of the invention according to the tenth aspect provides repeater equipment of the invention according to the second aspect wherein the intersymbol interference measuring means $15_1$ to $15_N$ show the degree or frequency of intersymbol interference measured in terms of a relative magnitude with two predetermined different thresholds. The repeating means $13_{11}$, $13_{12}$ to $13_{N1}$, $13_{N2}$ use as the degree or frequency of intersymbol interference to be multiplexed with the transmission information and control information extracted by regenerating means corresponding to one upstream or downstream route of the radio transmission lines among the regenerating means $11_{11}$, $11_{12}$ to $11_{N1}$, $11_{N2}$ the relative magnitude with the larger of the two different thresholds and use as the degree or frequency of intersymbol interference to be multiplexed with the transmission information and control information extracted by the regenerating means corresponding to the other upstream or downstream route the relative magnitude with the smaller of the two different thresholds.

That is, the relative magnitude with the larger of the two thresholds is transmitted as the degree or frequency of intersymbol interference at the preceding repeater section to the receiving end through the following repeater section, while the relative magnitude with the smaller of the two thresholds is transmitted as the degree or frequency of intersymbol interference in the preceding repeater section to the transmitting end back over the preceding repeater section.

Accordingly, the increase of the degree or frequency of intersymbol interference, in the process of the deterioration in the repeater section, is transmitted to the transmitting end preceding the receiving end and therefore the reconstruction and the communication control of the redundantly configured radio transmission lines can be established efficiently.

Specific embodiments of the present invention will now be explained in detail on the basis of the drawings.

Figure 5:
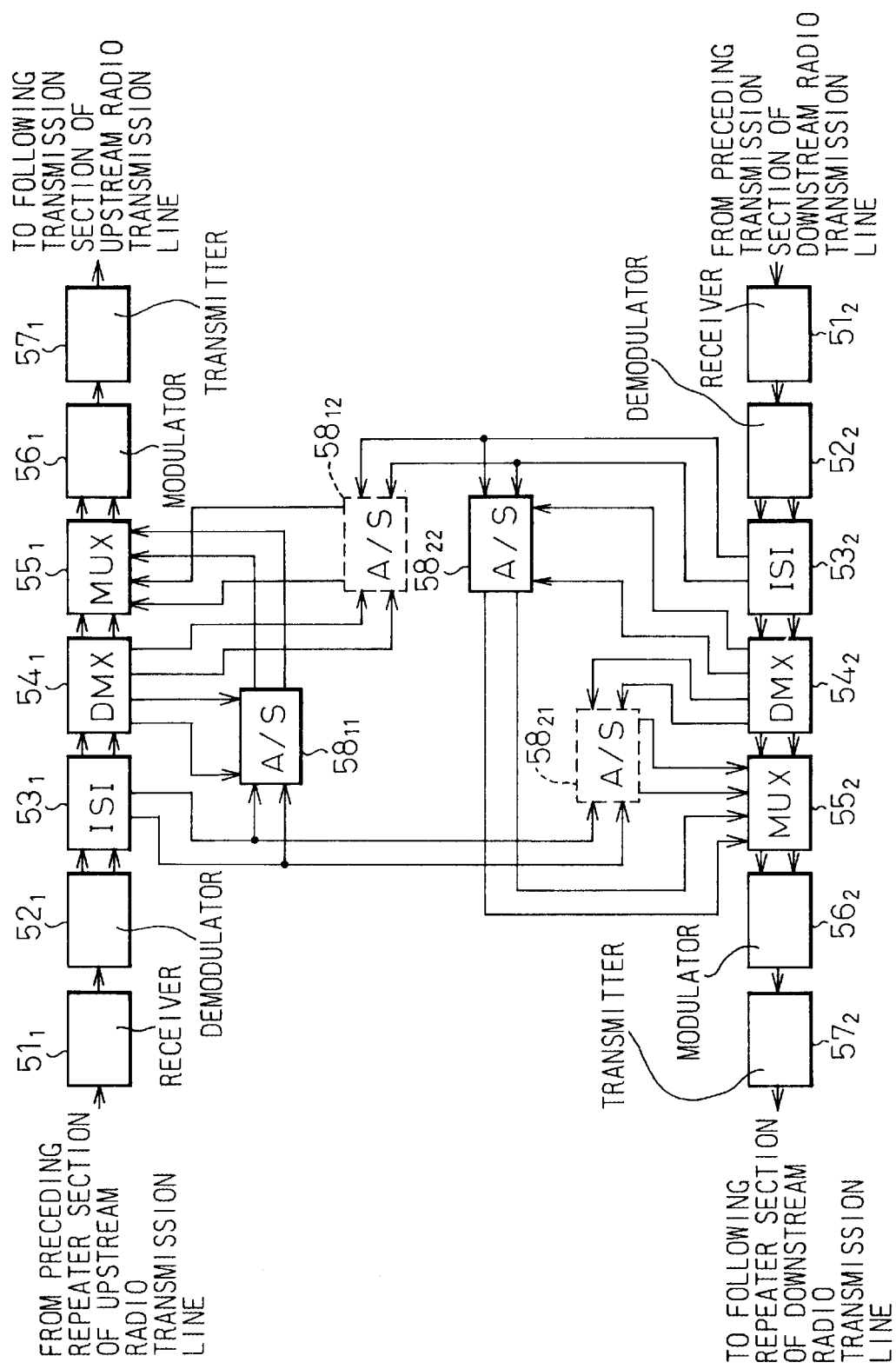
FIG. 5 is a view of an embodiment of the invention according to the first to fifth aspects, and the seventh and the tenth aspects.

FIG. 5 is a view of an embodiment of the invention according to the first to fifth aspects, and the seventh and the tenth aspects.

In the figure, the input terminal of the receiver $51_1$ is connected to the preceding repeater section along the upstream radio transmission line, while the output terminal of the receiver is connected to the input terminal of the demodulator $52_1$. The output terminal of the demodulator $52_1$ is connected to the input terminal of the intersymbol interference detecting unit (ISI) $53_3$, whose first output terminal is connected to the input terminal of the demultiplexing unit (DMX) $54_1$. The first output terminal of the demultiplexing unit $54_1$ is connected to the first input terminal of the multiplexing unit (MUX) $55_1$, whose output terminal is connected through the modulator $56_1$ to the input terminal of transmitter $57_1$. The transmission output terminal of the transmitter $57_1$ is connected to the following repeater section along the upstream radio transmission line.

The input terminal of the receiver $51_2$ is connected to the preceding repeater section along the downstream radio transmission line, while the output terminal of the receiver is connected to the input terminal of the demodulator $52_2$. The output terminal of the demodulator $52_2$ is connected to the input terminal of the intersymbol interference detecting unit (ISI) $53_2$, whose first output terminal is connected to the input terminal of the demultiplexing unit (DMX) $54_2$. The first output terminal of the demultiplexing unit $54_2$ is connected to the first input terminal of the multiplexing unit (MUX) $55_2$, whose output terminal is connected to the modulation input terminal of the transmitter $57_2$ through the modulator $56_2$. The transmission output terminal of the transmitter $57_2$ is connected to the following repeater section along the downstream radio transmission line.

The second output terminal of the intersymbol interference detecting unit $53_1$ is connected to the first input terminals of the adding/selecting units (A/S) $58_{11}$, $58_{21}$, while the second output terminal of the intersymbol interference detecting unit $53_2$ is connected to the first input terminals of the adding/selecting units (A/S) $58_{12}$, $58_{22}$. The second output terminal of DMX $54_1$ is connected to the second input terminal of the adding/selecting unit $58_{11}$, whose output terminal is connected to the second input terminal of MUX $55_1$. The second output terminal of the demultiplexing unit $54_2$ is connected to the second input terminal of the adding/selecting unit $58_{22}$, whose output terminal is connected to the second input terminal of MUX $55_2$. The third output terminal of DMX $54_1$ is connected to the second input terminal of the adding/selecting unit $58_{12}$, whose output terminal is connected to the third input terminal of MUX $55_1$. The third output terminal of DMX $54_2$ is connected to the second input terminal of the adding/selecting unit $58_{22}$, while the output terminal is connected to the third input terminal of MUX $55_2$. Note that the sections between the output terminals of the intersymbol interference detecting units $53_1$, $53_2$ and the input terminals of the modulators $56_1$, $56_2$ are connected maintaining correspondence of the channels at the two orthogonally intersecting baseband channels I and Q.

FIGS. 6A and 6B are views explaining the configuration and operation of an intersymbol interference detecting unit.

In FIG. 6A, the output terminal of the demodulators $52_1$, $52_2$ corresponding to one of the two baseband channels I and Q is connected to the input terminal of the A/D converter 61. The output terminal D1 of the two output terminals D1, D2 of the A/D converter 61 is connected to the input terminal of the corresponding demultiplexing unit. These two output terminals are connected to the corresponding input terminals of the exclusive OR gate 62. The output terminal of the exclusive OR gate 62 is connected to the input terminal of the counter 63. A clock whose period and pulse width are set to predetermined value is given to the gate input terminal of the counter. The output terminal of the counter 63 is connected to the corresponding input terminals of the multiplexing units $55_1$ (or $55_2$).

Note that a look at the correspondence between the block diagram of FIG. 5 and the block diagram of FIG. 1 shows that the receiver $51_1$, demodulator $52_1$, DMX $54_1$, receiver $51_2$, demodulator $52_2$, and DMX $54_2$ correspond to the regenerating means $11_{11}$, $11_{12}$ to $11_{N1}$, $11_{N2}$, the adding/selecting units $58_{11}$, $58_{12}$, MUX $55_1$, modulator $56_1$, transmitter $57_1$, adding/selecting units $58_{21}$, $58_{22}$, MUX $55_2$, modulator $56_2$, and transmitter $57_2$ correspond to the repeating means $13_{11}$, $13_{12}$ to $13_{N1}$, $13_{N2}$, and ISI $53_1$, $53_2$ correspond to the intersymbol interference measuring means $15_1$ to $15_N$.

Figure 7:
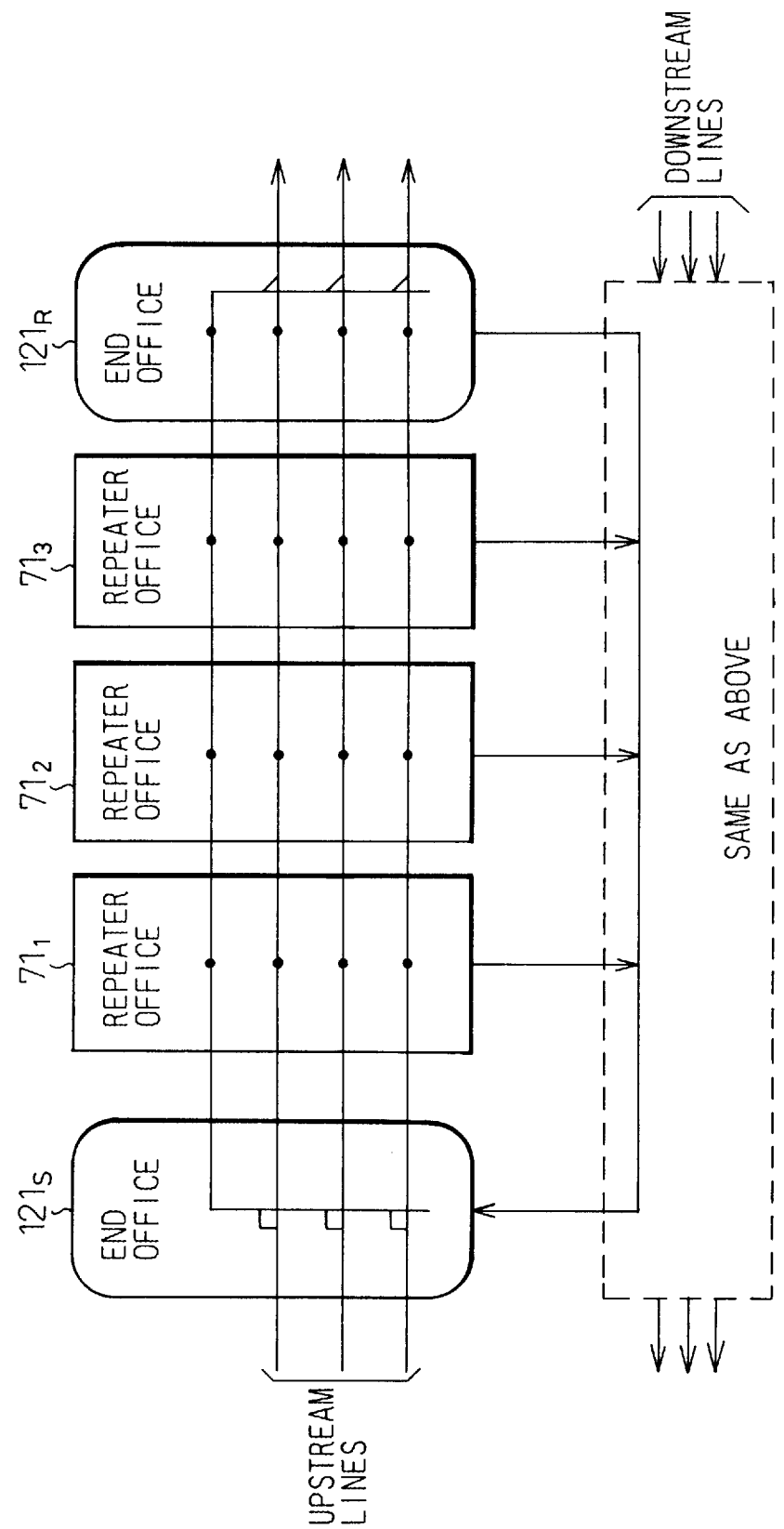
FIG. 7 is a view of the operation of the embodiment of the invention.

FIG. 7 is a view of the operation of the embodiments of the invention.

Figure 6:
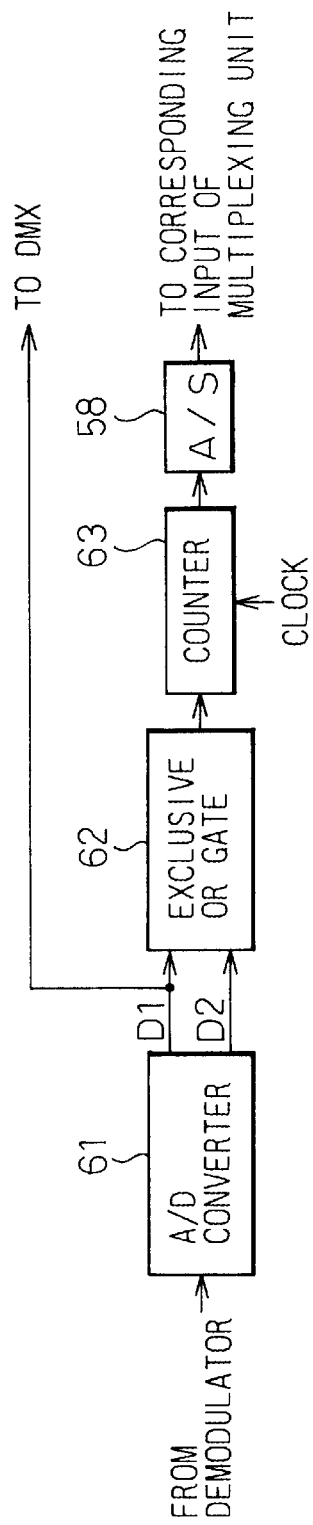
FIGS. 6A and 6B are views explaining the configuration and operation of an intersymbol interference detecting unit.

Below, the operations of the embodiments corresponding to the invention according to the second and third aspects will be explained referring to FIG. 5 to FIG. 7.

The feature of the embodiments, as shown in FIG. 7 and FIG. 16, lies in the provision of the repeater offices $71_1$ to $71_3$ in place of the repeater offices $122_1$ to $122_3$ shown in FIG. 16, and each of these repeater offices $71_1$ to $71_3$ can access the control use transmission line extending from the end office $121_R$ to the end office $121_S$.

The repeater equipment shown in FIG. 7, further, is provided in each of the repeater offices $71_1$ to $71_3$. The method of transmission of the control use transmission line and the configuration and operation of the end offices $121_R$ and $121_S$ are the same as in the related art, so will not be explained further here.

In the repeater office $71_1$, the receiver $51_1$ and the demodulator $52_1$ output the individually corresponding demodulated signals I and Q to the two orthogonally intersecting baseband channels I and Q by receiving and demodulating the received wave from the particular radio transmission line formed with the end office $121_S$.

At the intersymbol interference detecting unit $53_1$, the A/D converter 61 individually monitors the instantaneous values of the demodulated signals and transforms the relative magnitude of the zero point of the instantaneous value with the reference value ± e symmetric at the positive and negative sides of the zero point into the digital signals shown by the two bits $D_1$, $D_2$ shown in FIG. 6B. The exclusive OR gate 62 obtains the exclusive OR of the logical values of the digital signals obtained in this way so as to calculate the eye aperture and generates a binary signal showing if intersymbol interference has occurred.

Note that, the degree of the intersymbol interference in a state where the logical values of the binary signal invert, for example, in the case where the absolute value of the reference value ± e is half of the maximum value of the instantaneous value obtainable from an analog signal, as shown in FIG. 19, is transformed into a bit error rate of about "$10^{-10}$". Accordingly, deterioration of the transmission quality is detected earlier and faster in the invention compared with the related art where the bit errors are found and the relative magnitude with the threshold is judged based on the results of the parity check.

The counter 63 (FIG. 6A) counts the clock signals during the period that the logical value takes a specific value (here, one showing the state of occurrence of intersymbol interference for simplification) for such a binary signal and judges if the frequency of occurrence of the intersymbol interference exceeds a predetermined value or not as the presence or absence of an overflow. Note that below the binary information showing the result of the above judgement will be referred to as "upstream decision information". Further, the intersymbol interference detecting unit $53_1$ gives the above-mentioned demodulated signals I and Q to the demultiplexing unit $54_1$.

On the other hand, the intersymbol interference detecting unit $53_2$ similarly produces "downstream decision information" for the downstream radio transmission line showing if the frequency of occurrence of intersymbol interference exceeds a predetermined value and gives demodulated signals I and Q to the demultiplexing unit $54_2$.

The demultiplexing unit $54_1$ fetches the demodulated signals I and Q given by the intersymbol interference detecting unit $53_1$ in the above way, extracts the ISI alarm bits from the X-slot and Y-slot assigned individually to the upstream and downstream radio transmission lines based on the frame configuration shown in FIGS. 8A and 8B, and in parallel demultiplexes the transmission information (data bits) and service bits from the ISI alarm bits.

On the other hand, the demultiplexing unit $54_2$ similarly fetches the demodulated signals I and Q from the downstream radio transmission line given through the receiver $51_2$, demodulator $52_2$, and intersymbol interference detecting unit $53_2$, extracts the ISI alarm bits from the X-slot and Y-slot assigned individually to the downstream and upstream radio transmission lines based on the frame configuration shown in FIGS. 8A and 8B, and in parallel demultiplexes the transmission information (data bits) and service bits from the ISI alarm bits.

The adding/selecting (A/S) unit $58_{21}$ obtains the logical sum (OR) of the ISI alarm bits extracted from the Y-slot by MUX $54_2$ and the upstream decision information obtained by ISI $53_1$ in the above way and gives the result to MUX $55_2$. Further, the A/S $58_{22}$ obtains the logical sum (OR) of the ISI alarm bits extracted from the X-slot by DMX $54_2$ and the downstream decision information obtained by the intersymbol interference $53_2$ in the above way and gives the result to MUX $55_2$.

On the other hand, A/S $58_{12}$ obtains the logical sum (OR) of the ISI alarm bits extracted from the Y-slot by DMX $54_1$ and the downstream decision information obtained by intersymbol interference detecting unit $53_2$ in the above way and gives the result to MUX $55_1$. Further, A/S $58_{11}$ obtains the logical sum (OR) of the ISI alarm bits extracted from the X-slot by DMX $54_1$ and the upstream decision information obtained by ISI $53_1$ in the above way and gives the result to MUX $55_1$.

The multiplexing unit $55_2$ places the result of the logical sum obtained by A/S $58_{22}$ at the X-slot and the result of the logical sum obtained by A/S $58_{21}$ at the Y-slot, multiplexes them with the transmission information extracted by DMX $54_2$ based on the frame configuration shown in FIGS. 8A and 8B, and sends the result to the following transmission section of the downstream radio transmission line through the modulator $56_2$ and transmitter $57_2$.

Further, MUX $55_1$ similarly places the result of the logical sum obtained by the adding/selecting unit $58_{11}$ at the X-slot and the result of the logical sum obtained by A/S $58_{12}$ at the Y-slot, multiplexes them with the transmission information extracted by DMX $54_1$ based on the frame configuration shown in FIGS. 8A and 8B, and sends the result to the following transmission section of the upstream radio transmission line through the modulator $56_1$ and transmitter $57_1$.

That is, in the process of regenerative repeating performed for the upstream radio transmission line and the downstream radio transmission line, respectively, it is judged if the frequency of the intersymbol interference occurring at the preceding transmission section for the upstream (downstream) radio transmission line exceeds a predetermined value. As a result of the decision, there are reliably formed a return transmission line to the end office of the transmitting end through A/S $58_{21}$, MX $55_2$, modulator $56_2$, and transmitter $57_2$ (adding/selecting unit $58_{12}$, MX $55_1$, modulator $56_1$, and transmitter $57_1$) and a repeating transmission line to the end office of the receiving end through A/S $58_{11}$, MX $55_1$, modulator $56_1$, and transmitter $57_1$ (A/S/ $58_{22}$, MX $55_2$, modulator $56_2$, and transmitter $57_2$).

Accordingly, for example, when a notch occurs at a preceding repeater section along the upstream radio transmission line, ISI alarm bits showing this are sent in parallel to the downstream radio transmission line of the preceding repeater section and the following repeater section of the upstream radio transmission line.

In this way, according to this embodiment, the deterioration of the transmission quality arising due to a notch etc. is detected early and reliably for each repeater section at each repeater office as the degree or frequency of intersymbol interference and thereby the end equipment of the transmitting end and the receiving end can be notified before reaching a state where remarkable bit errors occur. Further, in this embodiment, assuming that the probability of notches occurring at the repeater sections is the same, the transmission quality can be improved by establishing parallel connecting transmission early by a time substantially equal to the transmission delay between the transmitting end and the receiving end compared with the related art wherein the fact of occurrence of bit errors at the receiving end was notified to the transmitting end only after their occurrence.

FIG. 9 is a view explaining the operation of an embodiment of the invention according to the first aspect.

In the figure, the difference from the configuration shown in FIG. 7 is the provision of the repeater offices $81_1$ to $81_3$ in place of the repeater offices $71_1$ to $71_3$ of FIG. 7.

The configuration of the repeater offices $81_1$ to $81_3$ is the same as that shown in FIGS. 5 except that A/S $58_{12}$, $58_{21}$ as shown by the dotted lines in FIG. 5 are not used.

Below, the operation of the embodiment of the invention according to the first aspect will be explained with reference to FIG. 5 and FIG. 9.

In this embodiment, the ISI alarm bits received from the preceding repeater section along the upstream (downstream) route and the upstream decision information (downstream decision information) obtained by ISI $53_1$ ($53_2$) are transmitted to the end office at the receiving end through the repeater transmission route formed by A/S $58_{11}$, MUX $55_1$, modulator $56_1$, and transmitter $57_1$ (A/S $58_{22}$, MUX $55_2$, modulator $56_2$, and transmitter $57_2$).

The end office at the receiving end fetches the thus transmitted ISI alarm bits and sends the request for a parallel connecting transmission to the end office at the transmitting end through an opposite route going back over the same repeater transmission route.

Accordingly, due to the present embodiment, the ISI alarm bits individually produced by the repeater offices are sent to the receiving end and the request for a parallel connecting transmission is reliably transmitted to the transmitting end, so the configuration of the repeater equipment is simplified, parallel connecting transmission is established earlier than notch growth, and therefore deterioration of the transmission quality can be mitigated better compared with the related art.

Below, an explanation will be made of the first operation of the embodiment of the invention according to the fourth aspect referring to FIG. 5, FIG. 7, FIG. 8 and FIG. 9.

In this embodiment, in the frame configuration shown in FIGS. 8A and 8B, the X-slot and Y-slot are formed as collections of a plurality of bits comprised of the bits individually corresponding to the respective repeater sections.

A/S's $58_{11}$, $58_{22}$ fetch the upstream decision information and downstream decision information produced by ISIs $53_1$, $53_2$ and give them to the input terminals of MUX's $55_1$, $55_2$ corresponding to the X-slot assigned to the following repeater section.

Further, A/S's $58_{12}$, $58_{21}$ fetch the downstream decision information and upstream decision information produced by ISIs $53_2$, $53_1$ and give them to the input terminals of the MUX's $55_1$, $55_2$ corresponding to the Y-slot assigned to the preceding repeater section.

MUX's $55_1$, $55_2$ separate the upstream decision information and downstream decision information given in this way for each repeater section, place them at the respective X-slot and Y-slot, multiplex them together with the transmission information etc., and send them to the adjoining transmission sections.

The end offices at the transmitting end and the receiving end recognize the upstream decision information and downstream decision information for each transmission section and, when recognizing that intersymbol interference is occurring at one of the transmission sections connected in series with a degree and frequency (or one of the degree and frequency) exceeding a predetermined threshold value, performs a logical decision for the parallel connecting transmission.

Accordingly, with the present embodiment, in the same way as the embodiments of the invention according to the first to third aspects, the transmission quality is improved over the related art and it is possible to start communication processing according to the results of recognition of the presence or absence of deterioration of the transmission quality for each transmission section and the degree of the same.

A second operation of the embodiment of the invention according to the fourth aspect will be explained below.

In this embodiment, the X-slot and Y-slot are assigned one each to the upstream radio transmission line and the downstream radio transmission line. ISI $53_1$ ($53_2$) outputs a value indicative of the degree of intersymbol interference as the upstream decision information (downstream decision information). Note that the processing for obtaining the degree of the intersymbol interference is as explained in the embodiments above, so will not be explained further here.

A/S $58_{11}$ ($58_{22}$) adds the values shown by the upstream decision information (downstream decision information) produced by ISI $53_1$ ($53_2$) and the upstream decision information (downstream decision information) demultiplexed by DMX $54_1$ ($54_2$) and gives the sum obtained from the addition to the input terminal of MUX $55_1$ ($55_2$) corresponding to the X-slot assigned to the following repeater section.

Further, the A/S $58_{12}$ ($58_{21}$) fetches the downstream decision information (upstream decision information) produced by ISI $53_2$ ($53_1$) and gives it to the input terminal of MUX $55_1$ ($55_2$) corresponding to the Y-slot assigned to the following repeater section.

MUX's $55_1$, $55_2$ separate the upstream decision information and downstream decision information given in this way for each repeater section, place them at the respective X-slot and Y-slot, multiplex them together with the transmission information etc., and send them to the adjoining transmission sections.

That is, the receiving end is notified of the cumulative value of the degrees and frequencies (or one of the degrees and frequencies) of the intersymbol interference occurring at the preceding repeater sections, while the transmitting end is notified of the cumulative value of the frequencies of the intersymbol interference occurring at the repeater sections constituting upstream radio transmission line.

Accordingly, the end equipment of the transmitting end and the receiving end can recognize the intersymbol interference notified in this way as multilevel information and establish parallel connecting transmission in accordance with the relative magnitude between that value and the predetermined threshold and perform logical decision processing in accordance with that parallel connecting transmission.

According to this embodiment, the end equipment at the transmitting end and receiving end can objectively judge at one time the degrees and frequencies (or one of the degrees and frequencies) of the intersymbol interference on the upstream and downstream radio transmission lines and can improve the transmission quality in accordance with the results of the decision and thereby enable optimal control of the communication.

Below, an explanation will be made of the operation of the embodiment of the invention according to the fifth aspect.

In this embodiment, ISI $53_1$ ($53_2$) outputs a value indicative of the degree and frequency of the intersymbol interference (or one of the degree and frequency) as the above-mentioned upstream decision information (downstream decision information).

A/S $58_{11}$ ($58_{22}$) compares this value and the content of the X-slot received from the preceding repeater section along the upstream (downstream) radio transmission line and demultiplexed by DMX $54_1$ ($54_2$) (showing the degree and frequency of the intersymbol interference (or one of the degree and frequency of the intersymbol interference)) and selects the one of the two with the higher degree and frequency (or one of the degree and frequency) of intersymbol interference, and gives to the input terminal corresponding to the X-slot of MUX $55_1$ ($55_2$).

A/S $58_{12}$ ($58_{21}$) similarly compares the value output by ISI $53_2$ ($53_1$) and the content of the Y-slot received from the preceding repeater section along the upstream (downstream) radio transmission line and demultiplexed by DMX $54_1$ ($54_2$) (showing the frequency of the intersymbol interference in the same way) and selects the one of the two with the higher degree and frequency (or one of the degree and frequency) of intersymbol interference, and gives to the input terminal corresponding to the Y-slot of MUX $55_1$ ($55_2$).

That is, the end equipment of the transmitting end and the receiving end are notified of the maximum values of the degrees and frequencies (or one of the degrees and frequencies) of the intersymbol interference in all of the upstream and downstream repeater sections and can establish parallel connecting transmission and control communications in accordance with the parallel connecting transmission based on the relative magnitude of the maximum values and a predetermined threshold, so the transmission quality can be improved compared with the related art.

Note, that the series of the receiver $51_1$, demodulator $52_1$, ISI $53_1$, DMX $54_1$, MUX $55_1$, demodulator $56_1$, and transmitter $57_1$ and the series of the receiver $51_2$, demodulator $52_2$, ISI $53_2$, DMX $54_2$, MUX $55_2$, demodulator $56_2$, and transmitter $57_2$ perform regenerative repeating in the same way as the above embodiments, so will not be explained further here.

Below, an explanation will be made of the operation of an embodiment of the invention according to the sixth aspect.

ISI $53_1$ ($53_2$), as shown in the above embodiments, finds the frequency of the intersymbol interference for the preceding repeater section along the upstream (downstream) radio transmission line and decides the relative magnitude of the frequency with a predetermined upper limit and lower limit. Note that below this series of processing will be referred to as "decision processing".

ISI $53_1$ ($53_2$) outputs information indicating the fact when the frequency exceeds the above upper limit (hereinafter referred to as "notification of the deterioration of the bit error rate") as the upstream (downstream) decision information and outputs information indicating the fact when the frequency falls below the lower limit (hereinafter referred to as "notification of restoration of the bit error rate") as upstream (downstream) decision information.

Note that the series of the receiver $51_1$, demodulator $52_1$, ISI $53_1$, DMX $54_1$, multiplexing unit $55_1$, modulator $56_1$, and transmitter $57_1$ and the series of the receiver $51_2$, demodulator $52_2$, ISI $53_2$, DMX $54_2$, MUX $55_2$, modulator $56_2$, and transmitter $57_2$ perform regenerative repeating in the same way as the above embodiments, so will not be explained further here.

That is, the end equipment of the transmitting end and the receiving end are reliably notified of the frequency of the intersymbol interference at the downstream and upstream radio transmission lines and the fact of deterioration or restoration of the bit error rate in accordance with the increment or decrement in that frequency with weighting. In this way, it is possible to start the parallel connecting transmission in accordance with the content notified and control the communication in accordance with the parallel connecting transmission.

Note that in this embodiment, the frequency of the intersymbol interference and the fact that the bit error rate deteriorates or is restored along with the increment and decrement in that frequency are output as upstream (downstream) decision information, but the present invention is not limited to this configuration. For example, in the same way as the embodiment of the invention according to the fourth aspect, the intersymbol interference detecting units may output values showing the degree of intersymbol interference as the upstream decision information (downstream decision information) and the above-mentioned decision processing may be performed at the end equipment of the transmitting end and receiving end.

The operation of the embodiment of the invention according to the seventh aspect will be explained below.

The feature of this embodiment lies in the procedure of the later explained processing performed in the end equipment of the receiving end. The configuration and operation of the repeater office is the same as in the embodiments of the invention according to the first to sixth aspects as shown in FIG. 5, so will not be explained here further.

The end equipment of the receiving end has a memory (not shown) in which memory areas of predetermined sizes are allotted individually for information obtained through the X-slot regarding the preceding repeater sections of a plurality of upstream radio transmission lines.

This end equipment fetches the upstream decision information received from the individual radio transmission lines and successively writes it in the memory areas allotted to the corresponding radio transmission lines in the above-mentioned memory areas. Further, the end equipment refers to the upstream decision information written in the memory separately for each radio transmission line in the order of the time sequence so as to determine if the degrees and frequencies of intersymbol interference (or one of the degree and frequency) of the individual radio transmission lines are increasing.

Further, the end equipment finds the thus determined degree and frequency (or one of the degree and frequency) and the incrementing rate of the same and, for example, when it is necessary to establish parallel connecting transmission for a plurality of radio transmission lines, establishes the parallel connecting transmission preferentially for the radio transmission line with the higher degree and frequency (or one of the degree and frequency) and higher incrementing rate.

Accordingly, according to this embodiment, since the standby radio transmission line is allotted preferentially to the radio transmission line with the worst deterioration of the transmission quality, the efficiency of utilization of the standby radio transmission line is raised and remarkable deterioration of the transmission quality can be kept to the minimum within the range of the transmission capability of the standby radio transmission line.

Note that this embodiment compares the degree or frequency of intersymbol interference along with the rate of increase of the intersymbol interference to compare the degree of deterioration of the transmission quality, but the invention is not limited to this configuration. When it is judged that the probability of notches occurring simultaneously at a plurality of radio transmission lines is negligibly small, it is also possible for example to compare just the rate of increase of the intersymbol interference.

Figure 10:
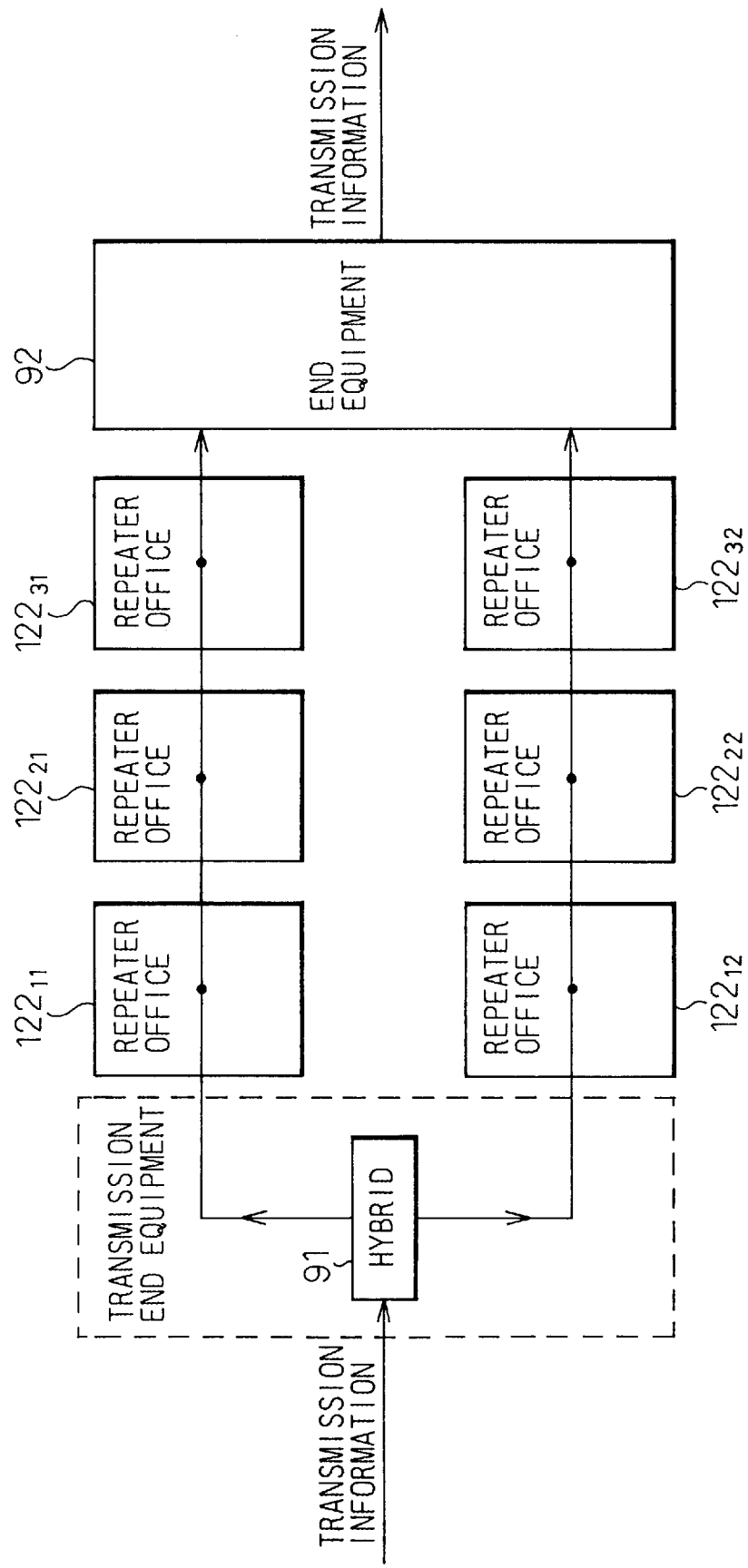
FIG. 10 is a view of an embodiment of the invention according to the eighth aspect.

FIG. 10 is a view of an embodiment of the invention according to the eighth aspect.

In this figure, functions and components the same as those shown in FIG. 16 are shown by the same reference numerals and will not be explained further here.

The input terminal of the hybrid 91 is connected to the output terminal of the end equipment at the transmitting end, not shown. The first output terminal of the hybrid 91 is connected to one of the receiving input terminals of the end equipment 92 at the receiving end through the tandem-connected repeater offices $122_{11}$ to $122_{31}$. Further, the second output terminal of the hybrid 91 is connected to the other receiving input terminal of the end equipment 92 through the tandem-connected repeater offices $122_{12}$ to $122_{32}$. Note that the hybrid 91 is mounted in the end equipment of the transmitting end as shown in FIG. 10 and the modulator and other components mounted in the end equipment of the transmitting end are omitted from the illustration for purposes of simplification.

The operation of this embodiment will be explained below.

In this embodiment, the operations of the repeater offices $122_{11}$ to $122_{31}$, $122_{12}$ to $122_{32}$ is the same as in the embodiments of the invention according to the first to sixth aspects explained above, so explanations will be omitted here.

The end equipment at the transmitting end sends out frames of the configuration shown in FIGS. 8A and 8B. These frames are sent in parallel through the hybrid 91 over the first repeater route comprised of the repeater offices $122_{11}$ to $122_{31}$ and the second repeater route comprised of the repeater offices $122_{12}$ to $122_{32}$. These repeater offices perform regenerative repeating and, like with the embodiments of the invention according to the first to sixth aspects, generate decision information indicative of the intersymbol interference for each repeater section or the frequency of intersymbol interference and send the same to the end equipment 92 through the slot X(Y).

The end equipment 92 compares the frequency of intersymbol interference for the first repeater route and the second repeater route in the same way as the end equipment of the receiving end in the embodiments of the invention according to the first to sixth aspects and selects and outputs the transmission information received from the repeater route with the smaller frequency.

Accordingly, the transmission quality of the transmission information selected in this way is kept high and the reliability achieved by duplexing of the repeater routes is further enhanced.

FIG. 11 is a view of an embodiment of the invention according to the ninth aspect.

In the figure, the antenna $101_1$ is connected to the input terminal of the receiver $102_1$, whose output terminal is connected through the demodulator $103_1$ to one of the input terminals of the logical decision control unit 104 and one of the input terminals of the switch 105. The antenna $101_2$ is connected to the input terminal of the receiver $102_2$, whose output terminal is connected through the demodulator $103_2$ to the other of the input terminals of the logical decision control unit 104 and the other of the input terminals of the switch 105. The output terminal of the logical decision control unit 104 is connected to the control input terminal of the switch 105, from whose output terminal a demodulated signal is obtained.

The operation of this embodiment will be explained below.

The receiver $102_1$ and the demodulator $103_1$ receive the wave arriving at the installation point of the antenna $101_1$ forming the first branch and demodulate the same to output a first demodulated signal. The receiver $102_2$ and demodulator $103_2$ receive the wave arriving at the installation point (point a predetermined distance away from the installation point of the antenna $101_1$) of the antenna $101_2$ forming the second branch and demodulate the same to output a second demodulated signal.

The logic decision control unit 104 fetches the first demodulated signal and the second demodulated signal and in the same way as the intersymbol interference detecting units $53_1$ ($53_2$) of the embodiments of the invention according to the first to sixth aspects finds the respective frequencies of intersymbol interference and judges the relative magnitude between the two.

The switch 105 selects and outputs the signal with the smaller frequency of intersymbol interference among the first demodulated signal and the second demodulated signal in accordance with the relative magnitude decided in this way.

Accordingly, according to this embodiment, the branch with the best transmission quality can be reliably selected from the results of the comparison of the frequencies of intersymbol interference at the branches even in a state where the transmission qualities are all excellent as compared with the conventional space diversity method where switching was based on merely the results of comparison of the intensity of the received field.

FIGS. 12A and 12B are views of an embodiment of the invention according to the tenth aspect.

The features of this embodiment lie in the later explained configuration of ISIs $53_1$, $53_2$. The configuration of the rest of the components is the same as shown in these figures, so explanations will be omitted.

In the intersymbol interference detecting unit adopted in this embodiment, as shown in FIG. 12A, a 4-bit A/D converter 111 is arranged at the first stage. The inverted logical value of the bit D3 of the LSB and the adjoining upper bit D2 in the output of the A/D converter are applied to the corresponding input terminals of the exclusive OR gate $112_1$. The bit D2 and the adjoining upper bit D1 are applied to the corresponding input terminals of the exclusive OR gate $112_2$. The output of the gate is applied to the input terminal of the counter $113_1$ and one of the input terminals of AND gate 114. The output of the exclusive OR gate $112_1$ is applied to the other of the input terminals of the AND gate 114, while the output of the AND gate 114 is applied to the input terminal of the counter $113_2$. The output of the counter $113_1$ is applied to the first output terminal $116_1$ through the latch $115_1$, while the output of the counter $113_2$ is applied to the second output terminal $116_2$ through the latch $115_2$.

The operation of this embodiment will be explained below.

The A/D converter 111 fetches the baseband signal I (or Q) given from the demodulator $52_1$ ($52_1$) and successively transforms the instantaneous value of the amplitude to binary code digital signals D1 to D4 of a 4-bit length.

The exclusive OR gate $112_2$ obtains the exclusive OR of the logical value of the bit D1 and the logical value of the bit D2 in the bits comprising the digital signals so as to decide if the eye aperture exceeds a predetermined threshold and outputs the result of decision as the first binary information.

The exclusive OR gate $112_1$ obtains the exclusive OR of the logical value of the bit D2 and the inverted logical value of the bit D3 and obtains the logical product with the first binary information and outputs the second binary information.

The counters $113_1$ and $113_2$, in the same way as the counter 63 shown in FIG. 6A, produce and output the decision information (hereinafter referred to as the "first decision information" and "second decision information") from the first binary information and the second binary information.

The latches $115_1$ and $115_2$ fetch the first and second decision information output from the counters $113_1$ and $113_2$ in this way (corresponding to upstream radio transmission line and downstream radio transmission line, respectively) and hold the already obtained decision information even while these counters perform a following counting operation.

The thresholds of the intersymbol interference, however, are determined by the combination of the bits given to the exclusive OR gates $112_1$ and $112_2$, so as shown in FIG. 12B, the threshold corresponding to the first binary information becomes a value larger than the threshold corresponding to the second binary information. Accordingly, the first decision information is obtained as a result of detection of the intersymbol interference with a higher sensitivity than the second decision information.

A/S's $58_{12}$ and $58_{21}$ place the second decision information in the Y-slot of the downstream radio transmission line, while A/S's $58_{11}$ and $58_{22}$ place the first decision information in the X-slot of the upstream radio transmission line. Further, in the process of occurrence or growth of the notches, the second decision information is obtained before the first decision information.

That is, the second decision information is sent to the transmitting end before the first decision information is sent to the receiving end, so parallel connecting transmission is established at the transmitting end before the time the receiving end performs synchronous control in accordance with parallel connecting transmission and changes transmission information under synchronous control. Accordingly, the efficiency of the parallel-connecting transmission is improved and the efficiency of use of the standby radio transmission line is enhanced.

Note that in this embodiment, the combinations of the bits input to the exclusive OR gates $112_1$ and $112_2$ and the thresholds relating to the generation of first decision information and second decision information based on the logical operations performed by the exclusive OR gates and AND gate 114 are set, but the present invention is not limited to these. For example, when the A/D converter 111 is a parallel type A/D converter, it is also possible to set the voltage division ratio of the voltage divider giving the reference voltage or the voltage given to the voltage divider to a suitable different value or fix these values and perform equivalent operations at the digital range based on arithmetic operations performed at the last stage of the A/D converter.

FIGS. 13A and 13B are views of a first modification of the embodiment shown in FIGS. 12A and 12B.

Comparing FIG. 13A and FIG. 12A, the bit D3 of FIG. 12A is input to the exclusive OR gate 112, without being logically inverted as in FIG. 13A. Further, there is the difference that the AND gate 114 of FIG. 12A is replaced by the OR gate 117 in FIG. 13A.

The effect of these differences, as becomes clear from a comparison of FIG. 12B and FIG. 13B, is that the sensitivity of detection of the intersymbol interference becomes much higher in FIG. 13B than in FIG. 12B.

FIGS. 14A and 14B are views of a second modification of the embodiment shown in FIGS. 12A and 12B.

Comparing FIG. 14A and FIG. 12A, in FIG. 14A, the exclusive OR gate $112_3$ is added and the AND gate 118 and the OR gate 117 are added as compared with FIG. 12A.

The sensitivity of detection of intersymbol interference shown in FIG. 14B is the lowest in level compared with FIG. 12B and FIG. 13B. The configuration of FIG. 14A is adopted when there are not any stringent demands on the transmission quality of the radio transmission line.

Further, in the above embodiments, 4-value QAM was adopted for the upstream and downstream radio transmission lines, but the present invention is not limited to this method of modulation. For example, it is also possible to be similarly applied to radio transmission lines adopting 16-value or 64-value QAM.

Further, in the above embodiments, an N+1 standby system was adopted as the redundant configuration of the radio transmission lines, but the present invention is not limited to this standby system. For example, it may also be applied to an N+2 standby system or a duplexed system.

Further, in the above embodiments, the decision information are multiplexed with the transmission information etc. by the time division multiplex mode and sent to the transmitting end or the receiving end, but the present invention is not limited to this multiplexing mode. It may be applied to a frequency multiplexing mode, CDMA mode, or any other multiplexed transmission mode so long as the decision information can be multiplexed for transmission without causing unallowable errors.

FIGS. 15A to 15F are views explaining specific examples of the adding/selecting unit shown in FIG. 5.

Figure 15A:
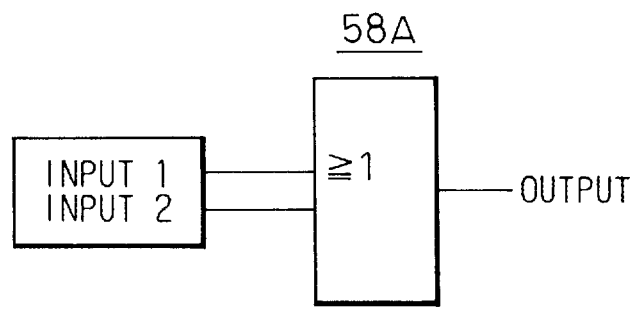

FIG. 15A shows an example of the adding unit 58A which adds two inputs comprised of binary signals to obtain a binary output. The adding unit 58A comprises an OR circuit.

| Input 1 | Input 2 | Output |
|---------|---------|--------|
| 0 | 0 | 0 |
| 0 | 1 | 1 |
| 1 | 0 | 1 |
| 1 | 1 | 1 |

Since the inputs are added, "1+1" does not equal "0", but "1+1" equals "1". Note that the input 1 is the result of detection of the intersymbol interference within one's own repeater office, while the input 2 is the result of the intersymbol interference measured at upstream repeater offices. The state is normal when both the input 1 and the input 2 are "0".

Figure 15B:
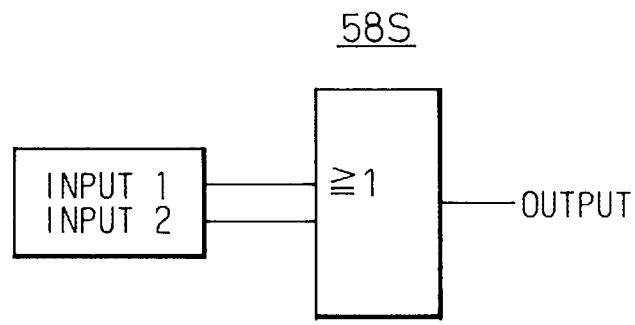

FIG. 15B shows a selecting unit 58S for selecting the larger of two inputs comprised of binary signals to obtain a binary output. This also comprises an OR circuit. For example, if the input 1 is "1" and the input 2 is "0", the larger binary signal becomes the output ("1").

Figure 15C:
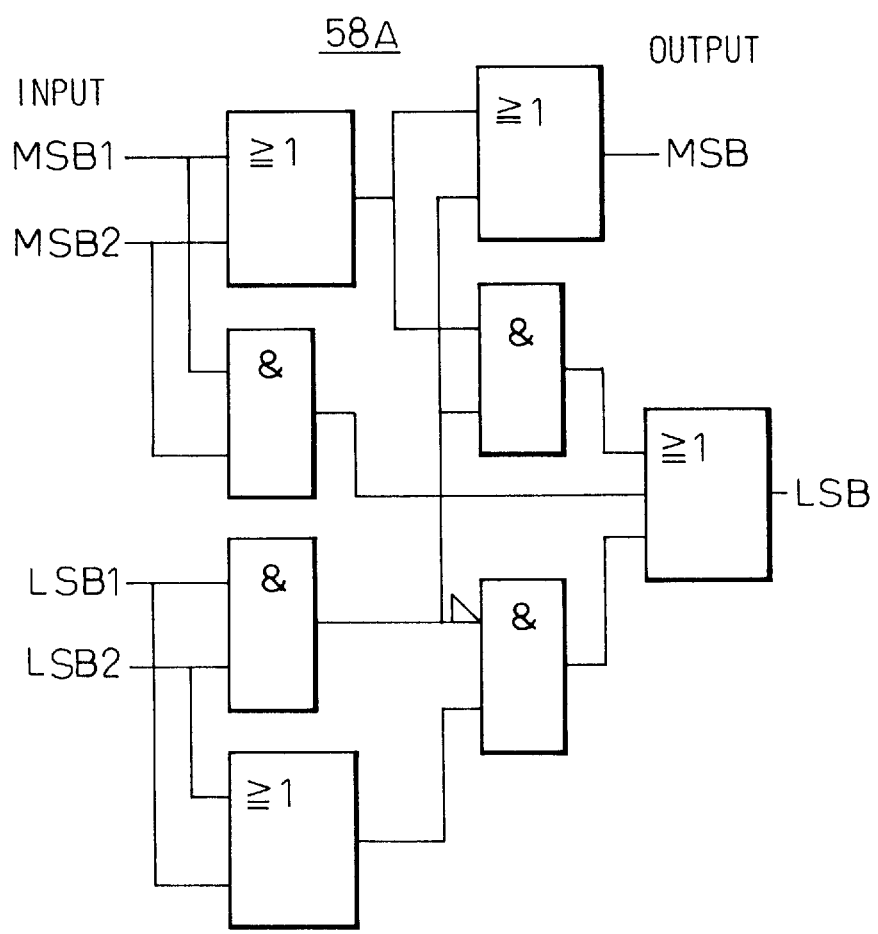

FIG. 15C is an adding unit 58A which adds inputs comprised of quaternary signals (MSB1, MSB2, LSB1, and LSB2) to obtain a quaternary signal output. As illustrated, it comprises four OR circuits and four AND circuits.

FIG. 15E is a truth table showing the operation of the adding unit 58A of FIG. 15C.

Figure 15D:
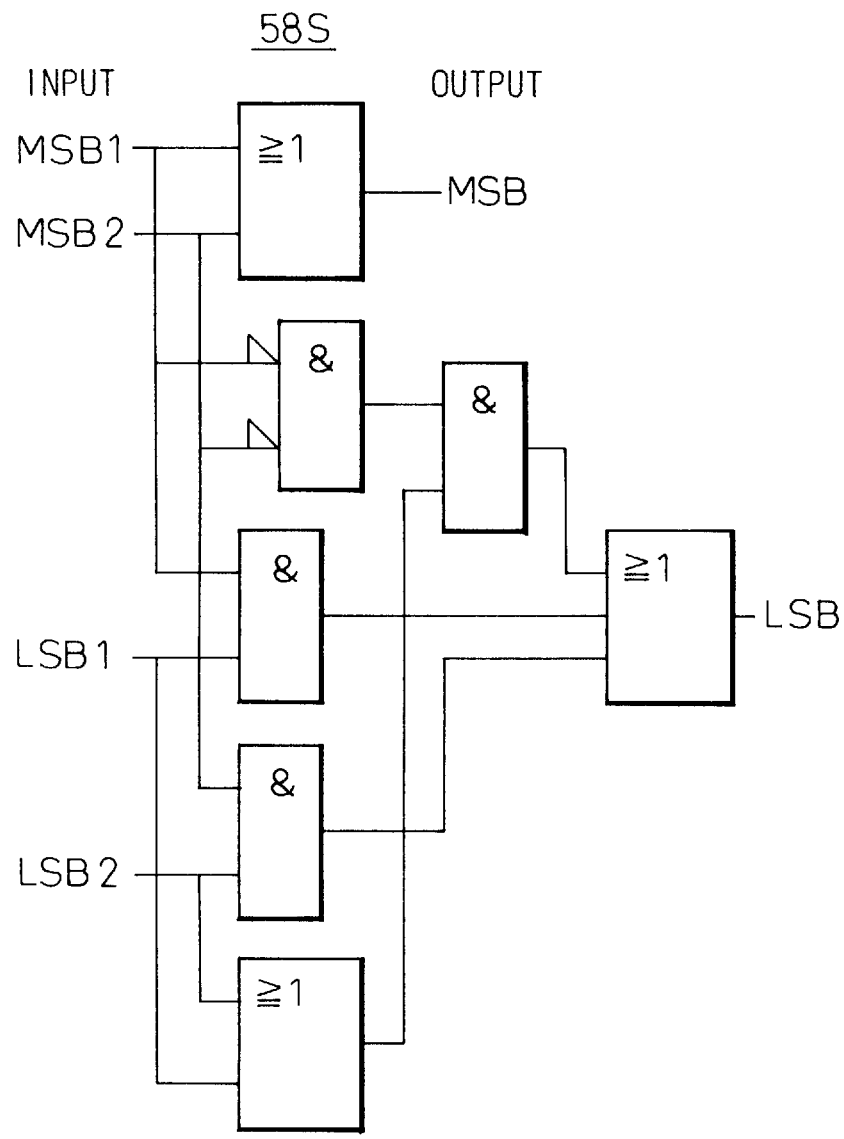

FIG. 15D is a selecting unit 58S for selecting the larger of the input 1 and input 2. Both are quaternary signals inputs (MSB1, MSB2, LSB1, and LSB2) to obtain a quaternary output. As illustrated, it is comprised of three OR circuits and four AND circuits.

FIG. 15F is a truth table showing the operation of the selecting unit 58S of FIG. 15D.

As explained above, in the invention according to the first to third aspects, before the bit error increases remarkably at a repeating point on full duplex redundantly configured radio transmission lines, a light deterioration of the transmission characteristics is measured as the degree or frequency of intersymbol interference and the degrees or frequencies of intersymbol interference along the upstream (downstream) routes of the individual radio transmission lines are directly sent to the upstream and/or downstream routes.

That is, the state of fluctuation of the transmission characteristics at the preceding repeater section is quickly and reliably notified to the transmitting end or the receiving end. At the transmitting end or receiving end, it therefore becomes possible to smoothly reconstruct the redundantly configured radio transmission lines and control communication based on the predetermined protocol in accordance with the state of fluctuation of the transmission characteristics notified in this way.

In the invention according to the fourth aspect, at a repeating point of the full duplex redundantly configured radio transmission lines, information indicative of the sum of the degrees or frequencies of intersymbol interference measured in each preceding repeater section along the upstream (downstream) routes of the radio transmission lines is quickly and reliably notified to the receiving end and/or the transmitting end through the upstream and/or downstream routes.

In the invention according to the fifth aspect, at a repeating point of the full duplex redundantly configured radio transmission lines, the largest value of the degree or frequency of intersymbol interference measured in each preceding repeater section in the upstream (downstream) routes of the radio transmission lines is quickly and reliably notified to the receiving end and/or the transmitting end through the upstream and/or downstream routes of the following repeater sections.

Accordingly, in the invention according to the fourth and fifth aspects, at the transmitting end and/or receiving end, it is possible to smoothly reconstruct the redundantly configured radio transmission lines and control the communication based on a predetermined protocol in accordance with the state of fluctuation of the transmission characteristics notified in this way.

In the invention according to the sixth aspect, at the transmitting end and/or receiving end, it is possible to smoothly reconstruct the redundantly configured radio transmission lines and control the communication based on a predetermined protocol in accordance with the state of fluctuation of the transmission characteristics of the radio transmission lines.

In the invention according to the seventh aspect, when the transmission characteristics of the plurality of radio transmission lines fluctuate in parallel, priority concerning the control of the parallel connecting transmission is given to the one where the degree or frequency of intersymbol interference caused by the fluctuation of the transmission characteristics increases the fastest, so the possibility of remarkable deterioration of the transmission quality is suppressed.

In the invention according to the eighth aspect, the transmission information and control information are sent through the transmission line with the smaller degree of intersymbol interference or deterioration of quality in the duplexed radio transmission lines. Accordingly, it is possible to maintain the transmission quality high and keep the reliability of the transmission line good not only when the transmission characteristics differ significantly among the radio transmission lines, but also when the transmission characteristics are all good.

In the invention according to the ninth aspect, since the transmission information obtained through the branch with the smallest degree or frequency of intersymbol interference among the transmission information received through the plurality of branches is successively selected and given, the transmission characteristics can be maintained good with a high reliability compared with the conventional space diversity method where branches were switched at the timing when the transmission quality fell below a predetermined value.

In the invention according to the tenth aspect, the increase of the degree or frequency of intersymbol interference is notified to the transmitting end prior to the receiving end back over the preceding repeater sections in the process of deterioration of the transmission characteristics in the preceding repeater sections, so the redundantly configured radio transmission lines can be reconstructed and communication controlled efficiently.

Accordingly, in the communication system using the invention according to these aspects, it becomes possible to raise the efficiency of use of the standby radio transmission line and maintain a high transmission quality of the working radio transmission lines and also possible to improve the reliability and efficiency of maintenance and operation and thereby reduce the running costs.

I claim:

1. Repeater equipment comprising:

a plurality of pairs of regenerating means between transmitting and receiving ends of the repeater equipment for individually receiving waves of upstream and downstream routes of redundantly configured radio transmission line formed under a full duplex mode at repeating points of the radio transmission lines and demultiplexing and extracting the transmission information and control information multiplexed in the received waves, a plurality of pairs of repeating means for multiplexing the transmission information and control information individually extracted by the plurality of pairs of regenerating means and relaying the multiplexed information to the following repeater sections through the redundantly configured radio transmission lines, a plurality of intersymbol interference measuring means for individually monitoring the increment and decrement of the eye apertures of the received waves and measuring the degree of frequency of intersymbol interference of received waves for one of the upstream and downstream routes of the redundantly configured radio transmission lines, wherein the repeating means corresponding to the one upstream or downstream route among the plurality of pairs of repeating means further includes means for multiplexing the transmission information and control information individually extracted by the regenerating means corresponding to that one rout among the plurality of pairs of regenerating means with information indicative of the degree or frequency of intersymbol interference individually measured by the plurality of intersymbol interference measuring means.

2. Repeater equipment as set forth in claim 1, wherein the repeating means corresponding to the other upstream or downstream route among the plurality of pairs of repeating means further including means for multiplexing the transmission information and control information individually extracted by the regenerating means corresponding to that other route among the plurality of pairs of regenerating means with information indicative of the degree or frequency of intersymbol interference individually measured by the plurality of intersymbol interference measuring means.

3. Repeater equipment as set forth in claim 2, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

4. Repeater equipment as set forth in claim 2, wherein
said control information includes information indicative of said degree or frequency of intersymbol interference transmitted by a repeater office and
said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

5. Repeater equipment as set forth in claim 2, wherein said degree or frequency of intersymbol interference is given by binary information or multilevel information showing discretely the conditions for said transmitting end or receiving end to start a predetermined communication control processing.

6. Repeater equipment as set forth in claim 2, wherein
said intersymbol interference measuring means includes means for showing the degree or frequency of intersymbol interference measured in terms of the resultant relative magnitude with two predetermined different thresholds and
said plurality of pairs of repeating means uses as the degree or frequency of intersymbol interference to be multiplexed with the transmission information and control information extracted by regenerating means corresponding to that one upstream or downstream route of the radio transmission lines among the plurality of pairs of regenerating means the one shown by the intersymbol interference measuring means as a result of the comparison of relative magnitude with the larger of the two different thresholds and uses as the degree or frequency of intersymbol interference to be multiplexed with the transmission information and control information extracted by the regenerating means corresponding to the other upstream or downstream route the one shown by the intersymbol interference measuring means as a result of the comparison of relative magnitude with the smaller of the two different thresholds.

7. Repeater equipment as set forth in claim 1, wherein
said control information includes information indicative of said degree or frequency of intersymbol interference transmitted by a repeater office and
said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

8. Repeater equipment as set forth in claim 1, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

9. Repeater equipment as set forth in claim 1, wherein said degree or frequency of intersymbol interference is given by binary information or multilevel information showing discretely the conditions for said transmitting end or receiving end to start a predetermined communication control processing.

10. Repeater equipment comprising:
plurality of pairs of regenerating means between transmitting and receiving ends of the repeater equipment for individually receiving waves of upstream and downstream routes of redundantly configured radio transmission lines formed under a full duplex mode at repeating points of the radio transmission lines and demultiplexing and extracting the transmission information and control information multiplexed in the received waves,
a plurality of pairs of repeating means for multiplexing the transmission information and control information individually extracted by the plurality of pairs of regenerating means and relaying the multiplexed information to the following repeater sections through the redundantly configured radio transmission lines,
a plurality of intersymbol interference measuring means for individually monitoring the increment and decrement of the eye apertures of the received waves and measuring the degree or frequency of intersymbol interference of received waves for one of the upstream and downstream routes of the redundantly configured radio transmission lines, wherein
the repeating means corresponding to the other upstream or downstream route among the plurality of pairs of repeating means further includes means for multiplexing the transmission information and control information individually extracted by the regenerating means corresponding to that other route among the plurality of pairs of regenerating means with information indicative of the degree or frequency of intersymbol interference individually measures by the plurality of intersymbol interference measuring means.

11. Repeater equipment as set forth in claim 10, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

12. Repeater equipment as set forth in claim 10, wherein
said control information includes information indicative of said degree or frequency of intersymbol interference transmitted by a repeater office and said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

13. Repeater equipment as set forth in claim 10, wherein said degree or frequency of intersymbol interference is given by binary information or multilevel information showing discretely the conditions for said transmitting end or receiving end to start a predetermined communication control processing.

14. End equipment comprising:

a plurality of receiving means for receiving and extracting for every radio transmission line transmission information, control information, and information indicative of a degree or frequency of intersymbol interference regeneratively repeated by repeater equipment, a plurality of intersymbol interference measuring means for individually monitoring the increment and decrement of eye apertures of received waves for the radio transmission lines and measuring the degree or frequency of intersymbol interference, incrementing rate monitoring means for obtaining for each radio transmission line the sum of the degree or frequency of intersymbol interference given as information given as said control information extracted by said plurality of receiving means or given as information multiplexed together with the control information and the degree or frequency of intersymbol interference measured by said intersymbol interference measuring means and differentiating the obtained sum so as to obtain the incrementing rate of the sum, and redundancy control means for finding for each radio transmission line the relative magnitude between the sum obtained by said incrementing rate monitoring means and a predetermined threshold and performing control for establishing parallel connecting transmission for the radio transmission line where the former exceeds the latter, wherein said redundancy control means including means for comparing for each radio transmission line the incrementing rate obtained by said incrementing rate monitoring means and giving priority to control for establishing parallel connecting transmission in the order of the largest incrementing rate down.

15. End equipment as set forth in claim 14, wherein said repeater equipment comprises:

a plurality of pairs of regenerating means between transmitting and receiving ends of said repeater equipment receiving waves of upstream and downstream routes of redundantly configured radio transmission lines formed under full duplex mode at repeating points of the radio transmission lines and demultiplexing and extracting the transmission information and control information multiplexed in the received waves, a plurality of pairs of repeating means for multiplexing the transmission information and control information individually extracted by the plurality of pairs of regenerating means and relaying the multiplexed information to the following repeater sections through the redundantly configured radio transmission lines, a plurality of intersymbol interference measuring means for individually monitoring the increment and decrement of the eye apertures of the received waves and measuring the degree or frequency of intersymbol interference of received waves for one of the upstream and downstream routes of the redundantly configured radio transmission lines, wherein the repeating means corresponding to the one upstream or downstream route among the plurality of pairs of repeating means further includes means for multiplexing the transmission information and control information individually extracted by the regenerating means corresponding to that one route among the plurality of pairs of regenerating means with information indicative of the degree or frequency of intersymbol interference individually measured by the plurality of intersymbol interference measuring means.

16. End equipment as set forth in claim 15, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

17. End equipment as set forth in claim 15, wherein said control information includes information indicative of said degree or frequency of intersymbol interference transmitted by a repeater office and said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

18. End equipment as set forth in claim 15, wherein said degree or frequency of intersymbol interference is given by binary information or multilevel information showing discretely the conditions for said transmitting end or receiving end to start a predetermined communication control processing.

19. End equipment as set forth in claim 14, wherein the repeating means corresponding to the other upstream or downstream route among the plurality of pairs of repeating means further including means for multiplexing the transmission information and control information individually extracted by the regenerating means corresponding to that other route among the plurality of pairs of regenerating means with information indicative of the degree or frequency of intersymbol interference individually measured by the plurality of intersymbol interference measuring means.

20. End equipment as set forth in claim 19, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

21. End equipment as set forth in claim 20, wherein said control information includes information indicative of said degree or frequency of intersymbol interference transmitted by a repeater office and said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

22. End equipment as set forth in claim 19, wherein said degree or frequency of intersymbol interference is given by binary information or multilevel information showing discretely the conditions for said transmitting end or receiving end to start a predetermined communication control processing.

23. End equipment as set forth in claim 14, wherein said repeater equipment comprises:

a plurality of pairs of regenerating means between transmitting and receiving ends of said repeater equipment for individually receiving waves of upstream and downstream routes of redundantly configured radio transmission lines formed under a full duplex mode at repeating points of the radio transmission lines and demultiplexing and extracting the transmission information and control information multiplexed in the received waves, a plurality of pairs of repeating means for multiplexing the transmission information and control information individually extracted by the plurality of pairs of regenerating means and relaying the multiplexed information to the following repeater sections through the redundantly configured radio transmission lines, a plurality of intersymbol interference measuring means for individually monitoring the increment and decrement of the eye apertures of the received waves and measuring the degree or frequency of intersymbol interference of received waves for one of the upstream and downstream routes of the redundantly configured radio transmission lines, wherein the repeating means corresponding to the other upstream or downstream route among the plurality of pairs of repeating means further includes means for multiplexing the transmission information and control information individually extracted by the regenerating means corresponding to that route among the plurality of pairs of regenerating means with information indicative of the degree or frequency of intersymbol interference individually measured by the plurality of intersymbol interference measuring means.

24. End equipment as set forth in claim 23, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

25. End equipment as set forth in claim 24, wherein said control information includes information indicative of said degree or frequency of intersymbol interference transmitted by a repeater office and said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

26. End equipment as set forth in claim 23, wherein said degree or frequency of intersymbol interference is given by binary information or multilevel information showing discretely the conditions for said transmitting end or receiving end to start a predetermined communication control processing.

27. End equipment comprising:

two demultiplexing means for demultiplexing transmission information and control information including information indicative of the degree or frequency of intersymbol interference measured by intersymbol interference measuring means regeneratively repeated through repeater equipment from duplexed radio transmission lines parallelly connected for transmission at all times by transmitting end, monitoring means for comparing the sums of the degree or frequency of intersymbol interference output by the two demultiplexing means and the degree or frequency of intersymbol interference measured by the intersymbol interference measuring means for the duplexed radio transmission lines and for finding the radio transmission line with the smaller value of the degree or frequency of intersymbol interference among the radio transmission lines, and selecting means for selecting the transmission information from the radio transmission line found by said monitoring means from among the transmission information demultiplexed for each radio transmission line by the two demultiplexed means.

28. End equipment as set forth in claim 27, wherein said repeater equipment comprises:

a plurality of pairs of regenerating means between transmitting and receiving ends of said repeater equipment for individually receiving waves of upstream and downstream routes of redundantly configured radio transmission lines formed under a full duplex mode at repeating points of the radio transmission lines and demultiplexing and extracting the transmission information and control information multiplexed in the received waves, a plurality of pairs of repeating means for multiplexing the transmission information and control information individually extracted by the plurality of pairs of regenerating means and relaying the multiplexed information to the following repeater sections through the redundantly configured radio transmission lines, a plurality of intersymbol interference measuring means for individually monitoring the increment and decrement of the eye apertures of the received waves and measuring the degree or frequency of intersymbol interference of received waves for one of the upstream and downstream routes of the redundantly configured radio transmission lines, wherein the repeating means corresponding to the one upstream or downstream route among the plurality of pairs of repeating means further includes means for multiplexing the transmission information and control information individually extracted by the regenerating means corresponding to that ne route among the plurality of pairs of regenerating means with information indicative of the degree or frequency of intersymbol interference individually measures by the plurality of intersymbol interference measuring means.

29. End equipment as set forth in claim 28, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

30. End equipment as set forth in claim 28, wherein said control information includes information indicative of said degree or frequency of intersymbol interference transmitted by a repeater office and said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

31. End equipment as set forth in claim 28, wherein said degree or frequency of intersymbol interference is given by binary information or multilevel information showing discretely the conditions for said transmitting end or receiving end to start a predetermined communication control processing.

32. End equipment as set forth in claim 27, wherein repeating means corresponding to the other upstream or downstream route among the plurality of pairs of repeating means further includes means for multiplexing the transmission information and control information individually extracted by the regenerating means corresponding to that other route among the plurality of pairs of regenerating means with information indicative of the degree or frequency of intersymbol interference individually measured by the plurality of intersymbol interference measuring means.

33. End equipment as set forth in claim 32, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

34. End equipment as set forth in claim 32, wherein said control information includes information indicative of said degree or frequency of intersymbol interference transmitted by a repeater office and said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

35. End equipment as set forth in claim 32, wherein said degree or frequency of intersymbol interference is given by binary information or multilevel information showing discretely the conditions for said transmitting end or receiving end to start a predetermined communication control processing.

36. End equipment as set forth in claim 27, wherein said control repeater comprises:

a plurality of pairs of regenerating means between transmitting and receiving ends of repeater equipment for individually receiving waves of upstream and downstream routes of reduntantly configures radio transmission lines formed under a full duplex mode at repeating points of the radio transmission lines and demultiplexing and extracting the transmission information and control information multiplexed in the received waves, a plurality of pairs of repeating means for multiplexing the transmission information and control information individually extracted by the plurality of pairs of regenerating means and relaying the multiplexed information to the following repeater sections through the redundantly configured radio transmission lines, a plurality of intersymbol interference measuring means for individually monitoring the increment and decrement of the eye aperatures of the received waves and measuring the degree or frequency of the intersymbol interference of received waves for one of the upstream and the downstream routes of the redundantly configures radio transmission lines, wherein the repeating means corresponding to the other upstream or downstream route among the plurality of pairs of repeating means further includes means for multiplexing the transmission information and control information individually extracted by the regenerating means corresponding to the other route among the plurality of pairs of regenerating means with information indicative of the degree or frequency of intersymbol interference individually measured by the plurality of intersymbol interference measuring means.

37. End equipment as set forth in claim 36, wherein said plurality of pairs of repeating means includes means for obtaining the sum of the degree or frequency of intersymbol interference shown by the information multiplexed with said transmission information and control information and the degree or frequency of intersymbol interference measured by said intersymbol interference measuring means before multiplexing the same.

38. End equipment as set forth in claim 36, wherein said control information includes information indicative of said degree or frequency of intersymbol interference transmitted by a repeater office and said plurality of pairs of repeating means includes means for limiting the degree or frequency of intersymbol interference shown by the information multiplexed in said transmission information to the larger value of the degree or frequency of intersymbol interference included in said control information and the degree or frequency of intersymbol interference measured by the intersymbol interference measuring means.

39. End equipment as set forth in claim 36, wherein said degree or frequency of intersymbol interference is given by binary information or multilevel information showing discretely the conditions for said transmitting end or receiving end to start a predetermined communication control processing.

* * * * *

UNITED STATES PATENT AND TRADEMARK OFFICE
CERTIFICATE OF CORRECTION

PATENT NO. : 5,875,209  
DATED : February 23, 1999  
INVENTOR(S) : Isao OGATA

Page 1 of 2

It is certified that error appears in the above-identified patent and that said Letters Patent is hereby corrected as shown below:

Col. 2, line 53, change "Figs. 8A and 8" to --Figs. 8A and 8B--.

Col. 8, line 6, change "$15_{11}$" to --$15_1$--.

Col. 9, line 23, delete "wain this".

Col. 13, line 59, change "$53_3$" to --$53_1$--.

Col. 14, line 9, change "the demultiplexinqunit unit" to --DMX--.

Col. 16, line 16, change "MUX" to --DMX--;  
lines 21-22, change "the intersymbol interference" to --ISI--;  
line 26, change "intersymbol interference detecting unit" to --ISI--;  
line 32, change "The multiplexing unit" to --MUX--;

UNITED STATES PATENT AND TRADEMARK OFFICE
CERTIFICATE OF CORRECTION

PATENT NO. : 5,875,209
DATED : February 23, 1999
INVENTOR(S) : Isao OGATA

It is certified that error appears in the above-identified patent and that said Letters Patent is hereby corrected as shown below:

Col. 16,    line 56, change "MX" to --MUX--;
           line 57, change "MX" to --MUX-- and change "adding/selecting unit" to --A/S--;
           line 60, change "MX" to --MUX--;
           line 61, change "MX" to --MUX--.

Col. 23,    line 47, begin a new paragraph with --Accordingly--.

Col. 32,    line 60, change "ne" to --one--.

Col. 34,    line 2, delete "control" and after "repeater" insert --equipment--.

Signed and Sealed this

Seventeenth Day of August, 1999

Attest:

Q. TODD DICKINSON

*Attesting Officer*     *Acting Commissioner of Patents and Trademarks*